United States Patent

[11] 3,587,054

[72] Inventors Edward R. Byrne
East Hanover Township, Morris County;
Robert A. Rieth, Mendham, both of, N.J.
[21] Appl. No. 757,944
[22] Filed Sept. 6, 1968
[45] Patented June 22, 1971
[73] Assignee Bell Telephone Laboratories, Incorporated
Murray Hill, Berkeley Heights, N.J.

[54] SCHEME ALLOWING REAL TIME ALTERATION OF A DATA PROCESSING SYSTEM OPERATING STRATEGY
16 Claims, 17 Drawing Figs.

[52] U.S. Cl. .......... 340/172.5
[51] Int. Cl. .......... G06f 9/00
[50] Field of Search .......... 340/172.5; 235/157

[56] References Cited

UNITED STATES PATENTS

| | | | |
|---|---|---|---|
| 3,333,252 | 7/1967 | Shimabukuro .......... | 340/172.5 |
| 3,399,384 | 8/1968 | Crockett et al. .......... | 340/172.5 |
| 3,478,321 | 11/1969 | Cooper et al. .......... | 340/172.5 |

*Primary Examiner*—Raulfe B. Zache
*Attorneys*—R. J. Guenther and R. B. Ardis

ABSTRACT: A computer-controlled phased-array radar system whose strategy for scheduling operations for performance utilizes two priority hierarchies is disclosed. Each operation is represented by a format that includes a desired high rate of performance parameter and a lower acceptable rate of performance parameter. With a light load, operations are scheduled for performance at their respective desired rates on the basis of a low order priority hierarchy. As the load increases, operations not being scheduled at their desired rates are scheduled at the lower acceptable rates on the basis of a higher priority hierarchy.

INVENTORS: E. R. BYRNE
R. A. RIETH
BY Norman W. McCloskey
ATTORNEY

| OPERATION | MAXIMUM TIME | DESIRED TIME | ELAPSED TIME | RADAR FACE | WAVE-FORM | RANGE | ANGLE |
|---|---|---|---|---|---|---|---|
| TRACK | M | D | ET | | | | |
| VERIFY | $M_V$ | $D_V$ | | | | | |
| SEARCH | $M_S$ | $D_S$ | | | | | |

| LOW DATA RATE PRIORITY TABLE | |
|---|---|
| PRIORITY | OPERATION |
| 1 | TRACK |
| 2 | VERIFY |
| 3 | SEARCH |

| HIGH DATA RATE PRIORITY TABLE | |
|---|---|
| PRIORITY | OPERATION |
| 4 | TRACK |
| 5 | VERIFY |
| 6 | SEARCH |

FIG. 9A

| MEMORY ADDRESS | OPERATION | MAX TIME | DESIRED TIME | ELAPSED TIME | RADAR FACE | WAVE FORM | RANGE | ANGLE |
|---|---|---|---|---|---|---|---|---|
| RAL1 | SEARCH | T1 | T'1 | ET1 | | | | |
| RAL2 | VERIFY | T2 | T'2 | ET2 | F2 | | | |
| RAL3 | SEARCH | T3 | T'3 | ET3 | | | | |
| RAL4 | VERIFY | T4 | T'4 | ET4 | F2 | | | |
| RAL5 | SEARCH | T5 | T'5 | ET5 | | | | |
| RAL6 | TRACK | T6 | T'6 | ET6 | F1 | | | |
| RAL7 | TRACK | T7 | T'7 | ET7 | | | | |
| ⋮ | ⋮ | ⋮ | ⋮ | ⋮ | | | | |
| RALn | SEARCH | Tn | T'n | ETn | | | | |

FIG. 9B

| MEMORY ADDRESS | ENABLED ENTRY POINTER | CHAIN POINTERS | PERFORMANCE TIME |
|---|---|---|---|
| LL1 | RAL2 | LL2 | PT1 |
| LL2 | RAL4 | | PT2 |
| ⋮ | | | |
| LLm | | | |

FIG. 9C

| MEMORY ADDRESS | F1 ORIGIN POINTERS | F2 ORIGIN POINTERS |
|---|---|---|
| S1 | | |
| S2 | | LL1 |
| ⋮ | | |
| S6 | | |

FIG. 9D

| MEMORY ADDRESS | ENABLED ENTRY POINTER | CHAIN POINTER | PERFORMANCE TIME |
|---|---|---|---|
| LL1 | RAL2 | LL3 | K−3 |
| LL2 | RAL3 | | 4K+1 |
| LL3 | RAL4 | | K−2 |
| LL4 | RAL5 | LL2 | 4K |
| LL5 | RAL6 | LL6 | K−1 |
| LL6 | RAL7 | | K+1 |
| LL7 | | | |
| ⋮ | ⋮ | ⋮ | ⋮ |
| LLm | RALn | LL4 | 2.5K |

FIG. 9E

| MEMORY ADDRESS | F1 ORIGIN POINTERS | F2 ORIGIN POINTERS |
|---|---|---|
| S1 | | |
| S2 | | |
| S3 | | |
| S4 | LL5 | |
| S5 | | LL1 |
| S6 | LLm | |

FIG. 10

| MEMORY ADDRESS | F1 ORIGIN POINTERS | F2 ORIGIN POINTERS |
|---|---|---|
| S1 | | |
| S2 | | |
| S3 | LLm | |
| S4 | LL5 | |
| S5 | | LL1 |
| S6 | | |

FIG. 11

| MEMORY ADDRESS | F1 ORIGIN POINTERS | F2 ORIGIN POINTERS |
|---|---|---|
| S1 | LL5 | |
| S2 | | LL1 |
| S3 | LLm | |
| S4 | | |
| S5 | | |
| S6 | | |

SCHEME ALLOWING REAL TIME ALTERATION OF A DATA PROCESSING SYSTEM OPERATING STRATEGY

GOVERNMENT CONTRACT

The invention herein claimed was made in the course of, or under contract with the Department of the Army.

BACKGROUND OF THE INVENTION

1. Field of the Invention

This invention relates to the real-time scheduling of operations to be performed by a computer-controlled traffic-handling system. More particularly, the invention relates to real-time scheduling of operations to be performed by a computer-controlled phased-array radar system as a function of the assigned operations load.

2. Description of the Prior Art

Computer-controlled phased-array radar systems are well known in the prior art. One such system is discussed in an article entitled "NIKE–X Will Use Hyper-Speed Computers" which appeared in AVIATION WEEK & SPACE TECHNOLOGY, Oct. 23, 1967. Another illustrative example of such a system is disclosed in a paper entitled "The AN/FPS–85 Real Time Data Processing System," presented by Dr. K. J. Deahl, of IBM Real Time Systems, Gaithersburg, Md., at the Real Time Systems Seminar, Houston, Tex., Nov. 2—4, 1966. A companion paper given at the same seminar entitled "The AN/FPS–85 Real Time Multiprogram Monitor for System/360,"c by Mr. P. H. Joslin of the same address as Dr. Deahl, generally discloses the computer program used to control the radar system.

Briefly, Dr. Deahl's paper shows a radar system that operates under the control of a computer system. The radar, under the control of a programmed computer system, searches the surrounding air space. When an object is detected the computer processes the resulting return and determines the next operation the radar is to perform with regard to the detected object. For instance, the computer may determine that a return from an object in a selected sector of the air space being searched requires that the radar begin tracking that object. This is accomplished by tracking operation commands, supplied by the computer periodically, which are performed by the radar. The commands the computer supplies to the radar are determined by a stored data analysis program which implements an operational strategy.

The Joslin paper discloses the program that schedules the operations supplied by the data analysis program for performance by the radar. This scheduling program utilizes the well-known single priority concept. In other words, a predetermined priority is associated with each operation command supplied by the data analysis program.

If, during processing, a new operation performance command is supplied by the data analysis program, the computer compares the priority of this operation with that of the operation currently being performed. When the priority of the new operation is higher than that of the operation currently being performed, performance of the latter operation is preempted and will not be completed until the higher priority operation has been performed. Similarly, when a set of new operation performance commands is received, where each operation of the new set has a priority higher than the operation being currently performed, the performance of the current task is preempted until all of the higher priority operations have been performed.

While operating the radar system in this manner insures the preferred performance of high priority operations, it does not make the most efficient possible use of the system since it fails to take into account the rate at which higher priority operations need to be performed. In other words, if a first set of $n$ operations, all having a priority which priority exceeds that of a second set of operations, are to be performed every $n$th period, the second set of operations will never be performed. That is, every period, it will be time to perform one of the $n$ higher priority operations and the performance of this operation takes precedence over the lower priority operations.

In many cases, performing each of the operations in the set of $n$ high priority operations every $n$th period, or alternatively, every $p$ seconds may represent a waste. For instance, performance at this rate may actually provide redundant data. Frequently, the first set of high priority operations can be performed at a slower rate $t$ without any loss of useful information. This being the case, the performance rate of the high priority operations can be reduced to $t$ which would make intervals available for performing the set of lower priority operations at some acceptable rate.

The prior art may be summed up as showing the scheduling of a computer-controlled radar system on the basis of a single priority hierarchy alone. As a result of using a single priority hierarchy as the sole criterion for scheduling operation performance, lower priority operations may not be performed even though the radar system is not being utilized to its full capacity for supplying useful data.

SUMMARY OF THE INVENTION

Applicants' invention utilizes a computer-controlled phased-array radar system more efficiently by scheduling the performance of operations on the basis of two or more priority hierarchies. For purposes of illustration the invention will be assumed to utilize two priority hierarchies.

In applicants' invention, each operation performance command includes; (1) an operation code, (2) a desired rate of performance parameter; and (3) a minimal rate of performance parameter. The desired rate of performance parameter indicates the rate at which the user desires the operation to be performed while the minimal rate of performance parameter indicates a lower rate at which the operation can be performed and still yield usable data. Each operation has a priority ranking in each of the two priority hierarchies and the priority of an operation at any given time is dependent on the rate at which it is being performed.

When the number of operations scheduled for performance does not approach the system's capacity, each operation is performed at its specified desired or high data rate. The operation's priority is its assigned priority in a high data rate priority hierarchy. However, as the number of operations to be scheduled increases, and performance of these operations at their respective desired rates approaches the system's capacity, some lower priority operations will not be performed because of the number of higher priority operations being scheduled ahead of them. When a point is reached such that the unperformed operations must be performed if their specified low data rate is to be complied with, the operations are assigned a new priority from a low data rate priority hierarchy. This low data rate priority is higher than any high data rate priority and the unperformed operations are the first to be scheduled in the next scheduling interval. Scheduling the unperformed operations in this manner reduces the performance rate of the operations being performed at the high data rate.

As the load of operations to be scheduled continues to increase, the rates of performance of a progressively larger number of operations are reduced to their respective specified minimal rates until all operations are being scheduled and performed at approximately their specified minimal rates. At this point, all of the operations are assigned priorities from the low data rate priority hierarchy which uses the same relative ranking of operation priorities as the high data rate priority hierarchy. It is only at this point that the performance of low priority operations will be preempted by the performance of an operation of higher priority.

In essence, the foregoing may be summed up as using a low order hierarchy of priorities in scheduling operations for performance at a high rate when the operation load is light and using a high order hierarchy of priorities in scheduling selected operations at lower rates of performance as the operation load increases. This variation in priority, and performance rates of the operations provide additional intervals during which new operations may be scheduled without requiring the preemption of performance of low priority operations.

While the foregoing has dealt with radar systems, applicants' invention is useful in any computer-controlled traffic-handling system whose load varies in real time. A specific example of another such system is the electronic switching system used for telephone call processing. In such a system, the inputs consist of a plurality of caller stations. When a caller places a call, the information is sensed by the switching system and the caller station is connected to the indicated called station. As the load of caller stations desiring a connection increases, the switching system adjusts the rate at which it services selected calling stations to provide connections for as many caller stations as possible. The system begins denying service only when a maximum number of caller stations are being serviced at their minimal rates. In other words, incorporating applicants' invention in a call processing electronic switching system provides an efficient system in which there is a graceful degradation of service as the input load increases.

The variation in operation priority as a function of the rate of operation performance, in response to the real-time variations in operation load, provides heretofor unknown flexibility and efficiency in operating real-time traffic-handling systems.

It is an object of this invention to more efficiently utilize capacities of real-time traffic-handling systems.

It is another object of this invention to achieve a graceful degradation of a real-time traffic-handling system operation as the traffic load increases.

It is a more specific object of this invention to increase the traffic-handling capacities of a real-time system by means of efficient scheduling of tasks to be performed.

It is a still more specific object of this invention to efficiently schedule the performance of operations on the basis of priorities which vary as a function of the past history of the operations' respective rates of performance.

A more thorough understanding of the invention, its numerous advantages and features, and its widespread applicability to the field of traffic handling will be gained upon considering the following description of the illustrative embodiment in conjunction with the drawings.

BRIEF DESCRIPTION OF THE DRAWINGS

FIGS. 9A, 9B, 9C, 9D, 9E, 10, and 11 are symbolic representations of tables in the computer memory which are useful in the detailed description of applicants' invention.

GENERAL DESCRIPTION

Figure 1:
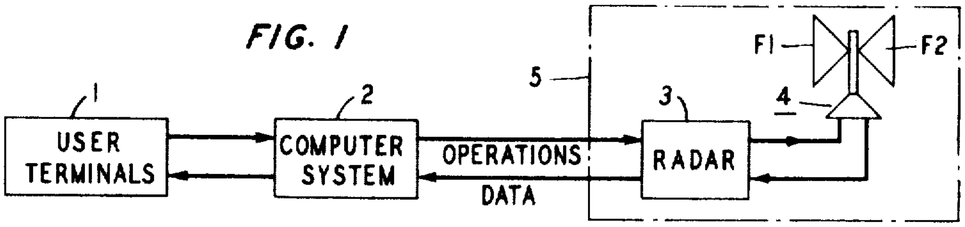
FIG. 1 is a general block diagram of a system in which applicants' invention is used to schedule operations for performance.

FIG. 1 shows a computer-controlled phased-array radar system. The user terminal 1 is a source of control signals for communicating with the computer system 2 and processed data is returned to the terminal 1 where it is analyzed and interpreted. The computer itself is programmed to automatically specify and schedule operations to be performed by the radar system 5. As the radar 5 performs the various operations assigned to it by the computer 2, the resulting data is fed back to the computer 2 which analyzes the data, returns part of it to the user terminal 1 and schedules future radar operations on the basis of the received data.

More particularly, when there are no objects being detected, the radar unit 5 performs repetitive search operations in selected portions of the surrounding air space. If, during the searching mode, an object is detected, the resulting return is fed to the computer 2 which may schedule another search operation that returns the search to the sector where the object was detected. This sector is scanned again and a second return indicates that the first return was due to the presence of a real object rather than a burst of noise. The computer then schedules a tracking operation which specifies a desired rate of performance and a minimal rate of performance for that operation.

As long as conditions are such that each operation due for performance by the radar 5 (FIG. 1) may be scheduled for performance at its desired rate, the tracking operation will be performed at its desired rate.

However, if enough other objects are detected by the radar 5, there will be an increase in the high priority tracking operations that are due to be scheduled for performance each interval. These operations are scheduled on the basis of priority. Consequently, when the returns become heavy enough, some lower priority operations, such as searching operations, due for performance during a given interval will not be scheduled for performance during that interval. During the scheduling of operations for the next interval, the computer 2 (FIG. 1) will sense that these operations were due for performance during the preceding interval but they were not performed. It may be that some low priority search operations are not scheduled again this interval even though they are past due for performance.

The above process will continue until the time elapsed since the last performance of these low priority search operations indicates that they must be performed during the next scheduling interval in order to comply with their specified minimal rates of performance. When this occurs, the computer 2 (FIG. 1) schedules these overdue operations ahead of the tracking operations which have a higher desired data rate priority than the desired data rate priority of the overdue operations.

In other words, operations having a low priority at their desired performance rate, take on a higher priority for performance at their minimal performance rates. This is accomplished by using a low order priority hierarchy and a high order priority hierarchy which both maintain the same relative operation priority ranking. The foregoing approach insures that low priority operations are performed at least as frequently as required by their specified minimal rates of performance unless the other operations are also being performed at their minimal rates.

Figure 2:
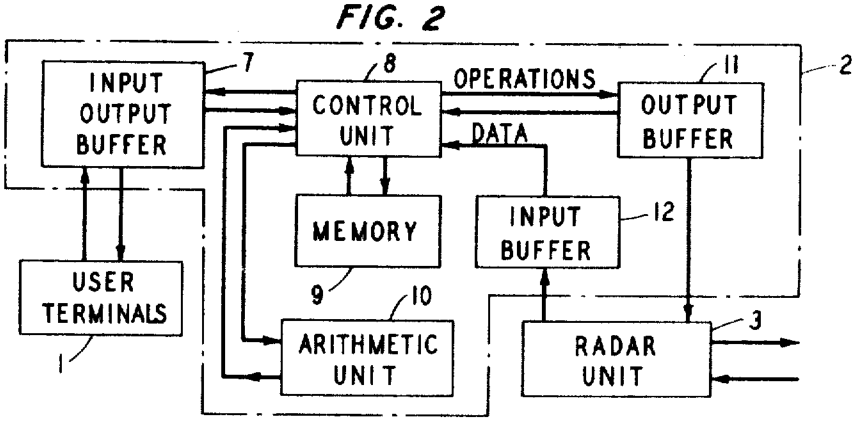
FIG. 2 shows a more detailed block diagram of the computer system in FIG. 1 which carries out the scheduling of radar operations.

FIG. 2 shows a more detailed block diagram of the computer system 2 shown in FIG. 1. The computer control unit 8 (FIG. 2) schedules operations for the radar 3 to perform during a given interval in accordance with a stored program. The resulting schedule of operations is stored in the form of a list in the output buffer 11. The radar performs the list of operations and the resulting data is returned to the control unit 8 via input buffer 12 as the operations are being performed.

Selected portions of this data are returned to the user terminal 1 via the input-output buffer 7. Simultaneously, the control unit 8 analyzes selected portions of the returned data, utilizing the arithmetic unit 10 and data stored in the memory 9, and determines what operations are to be performed during the next interval. When the number of scheduled operations in the buffer 11 decreases to a selected number, the control unit 8 begins scheduling the required operations and stores the resulting list in the empty buffer 11 locations. Using the buffers in this manner insures that the radar 3 never has to wait for operations to be scheduled.

The type of operations making up the list scheduled for each interval is determined by the programmed control unit 8 on the basis of the data returned to the control unit 8 by the radar 3 (FIG. 2). The relative placement of operations in the buffer 11 list reflects the order of their performance during an interval. The position each operation occupies in the list is based on its relative priority, its specified minimal rate of performance, and the time elapsed since its last performance.

The computer system 2 (FIG. 1) utilized to control the radar system 5 may be any general purpose computer system. Some well-known examples of such systems are the IBM 700 Series and 360 Series, and the GE 600 Series. The language in which the system may be programmed will depend on the type of support programs included as a part of the computer system. One widely used language having characteristics that are desirable for implementing applicants' scheduling technique is the FORTRAN IV language.

It is also well known that the operation of any programmed general purpose computer may be duplicated by a special purpose computer designed to carry out that operation. Furthermore, such a special purpose computer is obvious in light of the programmed general purpose computer. Consequently, the computer system 2 (FIG. 1) may be thought of either as a programmed general purpose computer, such as the GE 635, or a special purpose computer designed to perform operations equivalent to those performed by the programmed general purpose computer.

A special purpose wired program computer implementing applicants' invention may be obtained directly from the flow charts shown in FIGS. 6, 7, 8A, and 8B. It is common knowledge amongst logic designers that steps of adding and comparing in a flow chart represent adder and comparator circuitry that are well known. For instance, all the flow chart symbols requiring comparison steps may be replaced with well-known comparator circuitry such as that shown in the A. Chiapuzio, Jr. U.S. Pat. 3,137,789, issued June 16, 1964. Similarly all the flow chart symbols representing arithmetic operations may be replaced with known adder circuitry such as that shown in Millman and Taub, *Pulse, Digital,* and *Switching Waveforms*, pages 338—339 (1965). Those steps requiring accessing, alteration, or scanning of portions of memory may be replaced by well-known circuitry for addressing memories such as that shown in Huskey and Korn, *Computer Handbook*, pages 12—80 (1962). Similarly, the steps of initializing and updating, etc., are described in detail in the following text and merely require clearing and alerting of the indicated portions of memory by the indicated memory addressing circuitry. Finally, those steps requiring the use of a buffer to schedule the performance of a radar operation may be replaced by a buffer such as the one shown on pages 12—92 through 12—96 of the above-cited *Computer Handbook*.

For purposes of illustration, the computer system 2 (FIG. 1) will be considered to be the GE 635 Computer System which has been used to perform applicants' scheduling strategy. This system includes a FORTRAN IV compiler and a systems program. The FORTRAN IV language and compiler, and the systems program are disclosed in the GE-625/635 FORTRAN IV reference manual, CPB 1006E, Sept. 1966, and the GE-625/635 Comprehensive Operating Supervisor (GECOS), CPB 1195A, Sept. 1966, respectively. Copies of these manuals may be obtained from the General Electric Co., 13430 North Black Canyon Highway, Phoenix, Ariz. 85029.

Figure 3:
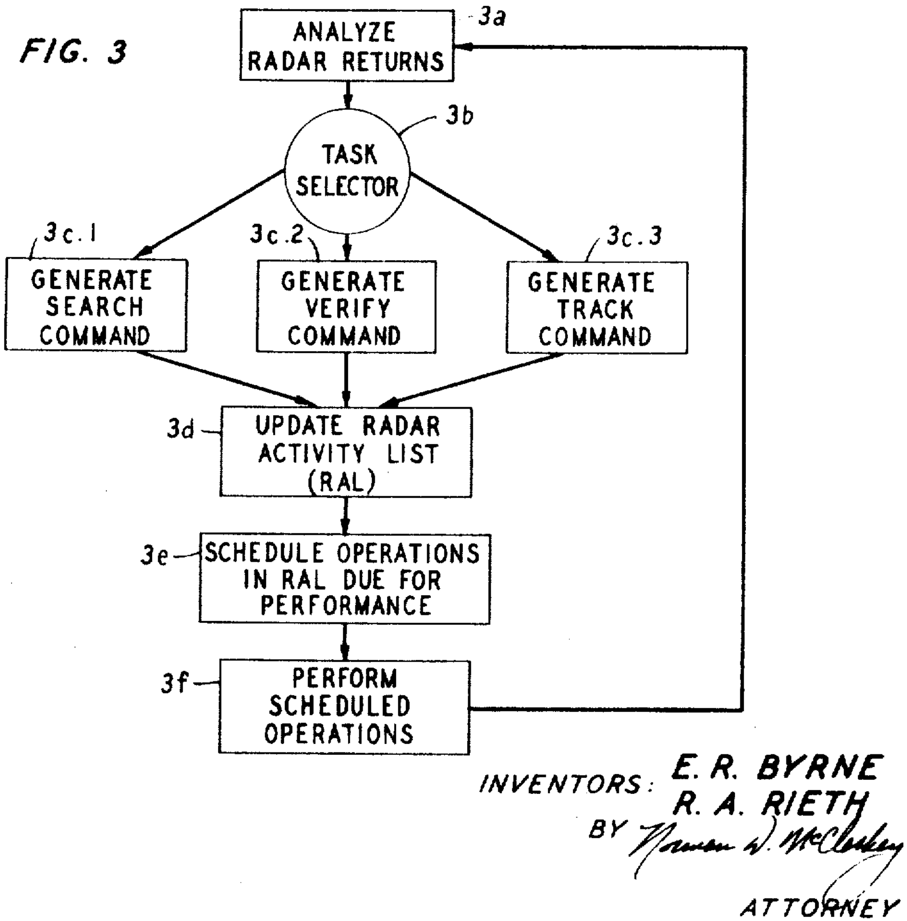
FIG. 3 is a general flow diagram representing the overall operation of the system in FIG. 1 which is useful in the description of applicants' invention.

A flow diagram, illustrating the general operation of the system shown in FIGS. 1 and 2, is shown in FIG. 3. As indicated in FIG. 3, the operation of the system is a closed loop requiring no human intervention. The system operates in accordance with a set of stored programs contained in the system memory 9 (FIG. 2).

Figures 4, 5A, 5B, 6:
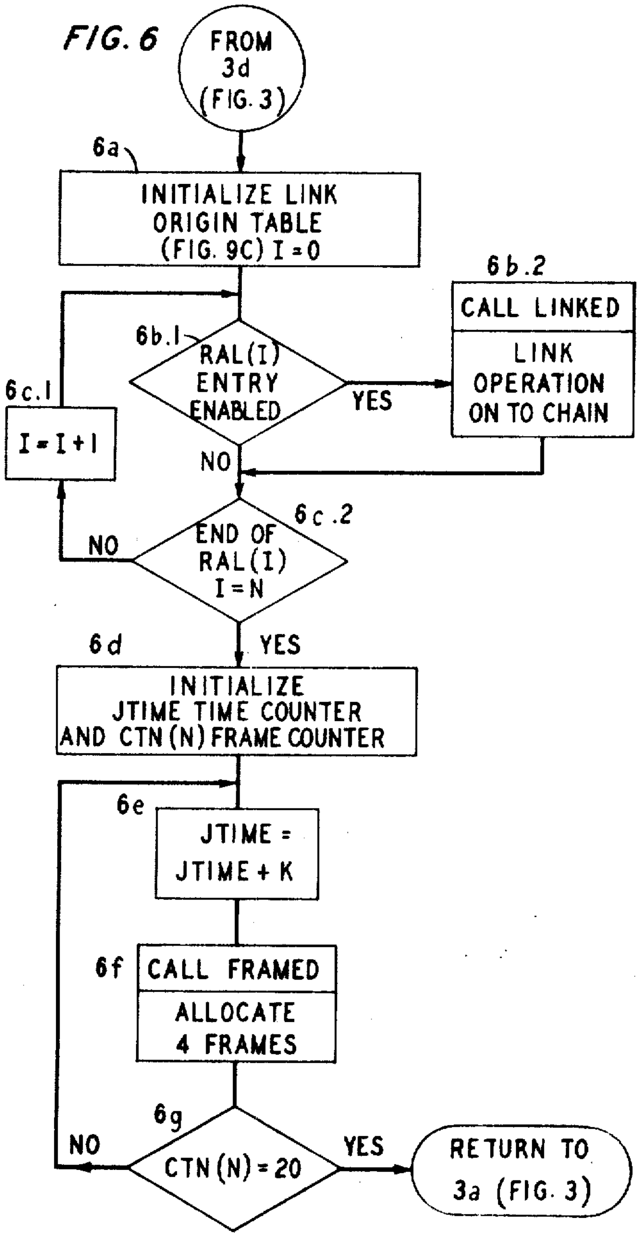
FIG. 4 is a symbolic representation of the radar operation command format generated by the system computer.
FIGS. 5A and 5B are symbolic representations of the two priority hierarchy tables stored in the computer memory.
FIGS. 6, 7, 8A, 8B are detailed flow diagrams representing the system operation in performing scheduling operations represented in step 3*e* of FIG. 3.

Referring to FIG. 4, a symbolic representation of a repertoire of known radar operations and their required format within the system is shown. An abbreviated repertoire of only three operations is disclosed. This abbreviated repertoire is sufficient to demonstrate the principles underlying the invention and, at the same time, its use eliminates needless redundancy in the detailed description. In practice, the operation repertoire of a computer controlled radar system ranges from 15 to 40 such operations. However, the use of three representative operations as a repertoire allows a full and concise explanation of the invention, making the expansion of it to include more operations obvious.

It will be recalled that applicants' invention is also useful in the field of electronic switching systems. This becomes very apparent, in light of the following discussion, if the radar operations are replaced by switching operations. Initially, the switching system scans a plurality of caller stations for off-hook conditions. Upon detecting an off-hook condition at a station, the system connects a dial tone generator to the station. After connecting the dial tone generator, the system scans the station periodically for dial pulses. It is obvious that the rate of scanning, and hence, the rate of performance of the various switching operations, may be varied in the same manner as the rate of performance of the radar operations is varied. In other words, the rate of performance of switching operations may be varied, within selected limits, as a function of real-time variations in the system's load to provide more efficient service.

The operations listed in FIG. 4 are the TRACK, VERIFY and SEARCH. They are listed in order of descending priority. The TRACK operation has the highest priority relative to the other two operations when they are all being performed at one of two rate classifications. FIG. 5A shows relative priorities for low rates and FIG. 5B shows them for high rates.

More particularly, the SEARCH operation is merely the scanning of a selected sector of air space by radar to determine if any objects are within that sector. The VERIFY operation is performed by the system when a search of a sector results in a return indicating an object is within the sector. During the VERIFY operation, the radar scans the same sector again and if another return results, this is taken to mean that the return is due to an object in that sector rather than the result of noise. Once the VERIFY operation has been completed and the results indicate the presence of an object in the scanned sector, the TRACK operation is performed periodically to supply information on the location of the object.

It will be noted that FIG. 4 shows the complete operation format required by the system. The MAXIMUM TIME and DESIRED TIME entries correspond to the low and high rates referred to above. The ELAPSED TIME entries represent a count, kept by the computer, which is a measure of the time elapsed since the operation was last performed. The RADAR FACE entry indicates which face of the radar antenna is to be used in performing the operation. The WAVEFORM entry indicates whether a long or a short pulse is required in performing the operation. All of these entries are used by the program in scheduling operations. The two remaining entries are required by the typical radar system but they are not essential to an explanation of the scheduling principles involved in applicants' invention.

Referring to FIG. 3, the radar is normally searching surrounding air space if no objects have been detected. In this mode of operation, series of search commands are generated by a search request task 3*c*.1 stored in the computer memory 9 (FIG. 2). As these commands are generated, they are entered into a radar activity list 3*d*, also contained in a part of a computer memory 9 (FIG. 2), to update the list.

Periodically, the entries in the radar activity list are scanned and the ones due for performance are scheduled 3*e* according to priority. The scheduled operations are then performed by the radar 3*f* which returns the resulting data for analysis 3*a* by the computer 2 (FIG. 2).

On the basis of the data resulting from the performance of each operation, one of the tasks 3*c*.1 through 3*c*.3 takes control of the computer 2 (FIG. 2). Under the control of any one of these tasks, the computer generates an operation command which is stored in the radar activity list. The formats of these operations are the machine language version of the symbolic formats shown in FIG. 4.

In a case similar to the one discussed above in defining the functions of the various radar operations, the system would operate in the following manner. Initially, the search command task 3c.1 (FIG. 3) would generate a search request at a time $t_1$ which would include the code for a SEARCH operation, a desired rate of performance parameter and the minimum rate of performance parameter. This information would be stored in the radar activity list 3d which also contains other commands. The search command generated at time $t_1$ has no effect on the system until the time that has elapsed between its storage in the radar activity list and a particular scheduling interval is equal to the interval indicated by the operation's desired rate of performance parameter. In terms of FIG. 4, this occurs when the DESIRED TIME variable D for the operation equals the contents of the ELAPSED TIME variable ET. When this equality occurs, the SEARCH operation is time enabled at its high rate and it is scheduled for performance 3e (FIG. 3) if there is sufficient time.

Assuming that the performance of this SEARCH operation 3f (FIG. 3) results in a return, the data is analyzed 3a and the results of this analysis are used to select the appropriate task to be performed 3b. In this case, the return was the first return resulting from the sector being scanned and accordingly, the verify request task 3c.2 is called. This task utilizes the information that was available at time $t_1$ along with data resulting from the analysis 3a to generate a VERIFY operation command which is entered in the radar activity list 3d. The VERIFY operation, which is a second scan of the original sector of air space, is scheduled for performance 3e as soon as it is time enabled. The operation is performed 3f and the resulting data is again analyzed.

As was indicated above, the second return from the same sector of air space indicates the presence of an object in that sector. Consequently, when the second return, resulting from performance of the VERIFY operation, is analyzed 3a (FIG. 3), this results in the selection of an operation command generation task 3b. In this case, since there was a second return from the same sector, the track command task 3c.3 is called. This task generates a command for the performance of a TRACK operation every D seconds desirably, and at least every M seconds. These parameters are reflected in appropriate locations associated with the TRACK operation shown in FIG. 4.

This newly generated track command is entered into the radar activity list 3d. Thus, when the ELAPSED TIME entry for the TRACK operation (FIG. 4) has been incremented to D, the operation will be time enabled at its high data rate and scheduled for performance the next scheduling interval, if possible.

As indicated above, the radar activity list is periodically scanned and selected time-enabled entries are scheduled for performance during the next radar performance interval. For the case where the number of time-enabled entries in the radar activity list is such that they may all be scheduled for performance at their respective desired rates, no problem of priority arises. However, if the number of TRACT entries in the radar activity list increases, as a result of increased air traffic, and the desired rates of performance for these TRACK operations is such that performing all of them at the desired rate would result in the SEARCH and VERIFY operations not being scheduled, there is a problem of priority.

According to applicants' invention, when the latter situation occurs, the periodic scheduling of time-enabled radar activity list entries continues at the same rate and the same number of frames of operations are scheduled each scheduling interval. However, each time a set of higher priority time-enabled TRACK operations are scheduled for performance, to the exclusion of lower priority time-enabled SEARCH and VERIFY operations, a clock associated with each of the excluded operations is incremented. As this process continues, a point is reached where the time elapsed since the last performance of selected excluded time-enabled SEARCH and VERIFY operations equal $M_s$ or $M_v$ (FIG. 4) respectively.

This condition indicates that if these operations are not performed in the next radar performance interval 3f (FIG. 3), their rates of performance will fall below their respective specified minimal rates. Consequently, these operations are scheduled ahead of the TRACK operations during this scheduling interval. In other words, the lower priority SEARCH and VERIFY operations have a new priority assigned to them for this scheduling interval.

The concept of multiple operation priorities that are varied according to the operation's performance rate history is represented by the two priority tables shown in FIGS. 5A and 5B. While the relative priorities in each table are the same, the priorities in the FIG. 5A table are all higher than those in the FIG. 5B table. The priorities of the SEARCH and VERIFY operations are 6 and 5 (FIG. 5B) respectively for performance at the desired rate while the TRACK operation priority is 4 for this rate of performance. However, for the low rate of performance, the SEARCH and VERIFY operations priorities become 2 and 3 (FIG. 5A) respectively. These are higher than the TRACK operation priority of 4 for the desired rate of performance.

During a scheduling interval where the SEARCH and VERIFY operations are enabled at the low data rate, they are assigned their respective low data rate priorities of 2 and 3 (FIG. 5A). This results in these operations being scheduled ahead of the TRACK operation which is enabled at the high rate of performance and has a priority of 4 (FIG. 5B). When the SEARCH and VERIFY operations are scheduled in this manner, their respective clocks are cleared so that after their performance the elapsed time count may begin again for each of these operations.

After the lower priority SEARCH and VERIFY operations are scheduled ahead of the higher priority operations to insure their minimal rates of performance, the higher priority TRACK operations are again scheduled at their respective desired rates. That is, scheduling is again carried out on the basis of only the high data rate priorities shown in FIG. 5B. This mode of scheduling continues until the elapsed time variables associated with the various lower priority operations again equal $M_s$ and $M_v$ (FIG. 4), indicating that the latter must be performed if their performance rate is not to drop below their respective specified minimal rates. At this point, the lower priority operations have become enabled at their respective low data rates again and they are assigned new higher priorities from the low data rate priority table (FIG. 5A). These new priorities will be used during the next scheduling of operations in the same manner as discussed above.

If there are enough entries in the radar activity list, the number of low priority operations, enabled at their respective low data rates, will be such that the higher priority TRACK operations are all being performed at their minimal rates. When this situation exists, all priorities are being assigned from the table in FIG. 5A. It is only after the enabled operations in the radar activity list exceed this number that lower priority operations are performed at less than their minimal rate, or practically, not performed.

The foregoing is easily seen by referring to FIGS. 5A and 5B. While the priority for the TRACK operation at the desired data rate is 4 (FIG. 5B), as compared to priorities 2 and 3 (FIG. 5A) for the VERIFY and SEARCH operations enabled at the low data rate, the low data rate priority for the TRACK operation is 1 (FIG. 5A). Consequently, if there are enough TRACK operations enabled at their respective low data rate with a priority of 1, the lower priority operations will not be scheduled for performance.

The above may be summarized as follows: The radar system 5 (FIG. 1), under the control of the programmed computer system 2 (FIG. 1), repetitively searches various sectors of air space until an object or objects result in radar returns. On the basis of these returns, selected VERIFY operation commands are generated by the computer 2 (FIG. 2) and entered into a radar activity list stored in the computer memory 9 (FIG. 2) along with SEARCH operation commands. These operations are performed on the basis of their respective high data rate priorities, the VERIFY operation being of higher priority than the SEARCH operation. The data resulting from the performance of the VERIFY operations cause TRACK operation commands to be entered in the radar activity list when performance of the VERIFY operations indicates the presence of objects. The newly generated TRACK operations are of a higher desired data rate priority than any SEARCH or VERIFY operations requests in the activity list and, as such they are scheduled for performance at a high desired rate ahead of the lower priority operations.

This mode of operation continues until there are lower priority operations in the list which must be performed in the next interval if they are going to be performed at their respective specified minimal data rates. When this occurs, the lower priority operations are scheduled according to their low data rate priority (FIG. 5A) which is higher than the high data rate priority (FIG. 5B) of the TRACK operations. Consequently, the former operations are scheduled ahead of the TRACK operations, which have a higher desired data rate priority, for performance during the next interval.

Scheduling operations as described above results in the TRACK operations being scheduled for performance at a rate varying between their minimal rates and their desired rates of performance. This variation is a function of the real-time changes in air traffic load. Once all of the highest priority operations are being performed at the minimal data rates, in order to allow the performance of a maximum number of operations, no additional lower priority operations will be performed. At this point, the system is being used to its full capacity.

DETAILED DESCRIPTION

FIGS. 6, 7, 8A, and 8B show detailed flow diagrams of the scheduling task represented by block 3*e* in FIG. 3. The main flow of the scheduling program, SCHEDULE, is represented by FIG. 6. Under the control of this program the computer 2 (FIG. 2) periodically scans the radar activity list stored in a portion of its memory 9 (FIG. 2) and detects all the entries due for performance in the list for this scheduling period. As each time-enabled entry in the radar activity list is detected by the program SCHEDULE (FIG. 6), a subroutine program LINKED (FIG. 7) is called.

The LINKED subroutine stores address information on the location of all time-enabled entries in the radar activity list. In other words, the LINKED subroutine creates a table in the computer memory 9 (FIG. 2) that identifies all radar activity list entries due for performance at the time of the current scheduling period. Furthermore, the subroutine also determines the time at which each operation associated with the various addresses in this table is to be performed and the data rate at which the operation is enabled. Using this information, LINKED then orders all the operations on the basis of priority and, within each priority class, on the basis of time of performance.

After the LINKED subroutine (FIG. 7) has completed forming the above table of all time-enabled radar activity list entries, control of the computer is returned to the program SCHEDULE (FIG. 6). SCHEDULE then initializes selected counters and calls the subroutine FRAMED (FIGS. 8A and 8B) which schedules selected ones of the time-enabled operations identified in the table generated by the LINKED subroutine for performance by the radar.

This scheduling is accomplished by the computer, under the control of FRAMED, scanning the table of address pointers generated by LINKED in a selected order and storing the associated radar activity list operations in the buffer 11 (FIG. 2) in the same order. Additionally, the FRAMED subroutine updates the elapsed time parameters (FIG. 4) associated with each entry in the radar activity list. Control of the computer is then returned to the data analysis program 3*a* (FIG. 3) and the radar 5 (FIG. 1) sequentially performs the various operations stored in the buffer 11 (FIG. 2). When the number of operations remaining in the buffer 11 decreases to a selected number, the program SCHEDULE is called again and a new set of operations is scheduled.

Symbolic representations of the tables generated by the execution of the above-described scheduling program are shown in FIGS. 9A through 9C. For purposes of clarity the table generated by the LINKED subroutine (FIGS. 9B and 9C) is shown as two separate tables even though in practice it may be a single table within the computer memory 9 (FIG. 2). In practice, each of the three tables represent a block of physical locations in the computer memory 9 (FIG. 2). The entries in the column labeled "address," in each of the tables represent the memory address containing the data represented to the right of the address entry.

The table in FIG. 9A represents an *n* entry radar activity list with operation entries indicating that some objects are being tracked, some returns are being verified, and some normal SEARCH operations are being carried out for certain sectors. For each operation entry in the list there are also entries indicating the maximum $T(i)$ and the desired $T'(i)$ times between performance of the operation. Additionally, each operation has an elapsed time variable $ET(i)$ (FIG. 9A) associated with it that indicates how long it has been since the operation was last performed. A parameter designating the radar antenna face to be used in performing the operation and a parameter indicating the required pulse width is also shown. The range and angle information entries are shown for the sake of completeness.

As indicated generally above, the main flow of the scheduling task periodically scans the entries in the *n* locations of the radar activity list (FIG. 9A) the first set of instructions in the program SCHEDULE 6*a* (FIG. 6) initializes the contents of the pointer origin table shown in FIG. 9C which may contain information from the last scheduling interval.

The next step 6*b*.1 (FIG. 6) in the program SCHEDULE is to determine which of the *n* entries in the radar activity list (FIG. 9A) are due for performance during this interval. This is accomplished by a set of computer instructions which compares the elapsed time variable $ET(i)$ (FIG. 9A), associated with each operation entry, with the desired time variable $T'(i)$. If $ET(i)<T'(i)$ for a particular variable entry, the operation is not time enabled and consequently, it is not due for performance. In this case, no entry is made in either the list of pointers table (FIG. 9B) or the origin table (FIG. 9C) and the program performs a comparison for the variables $ET(i+1)$ and $T'(i+)$ associated with the $(i+1)^{th}$ entry in the activity list (FIG. 9A).

On the other hand, if the comparison of the $i^{th}$ activity list entry variables indicate $ET(i)$ $T'(i)$, the next step in the program 6*b*.2 (FIG. 6) is to make an entry in a list of pointers table (FIG. 9B) indicating that the $i^{th}$ entry in the radar activity table is due for performance.

Figure 7:
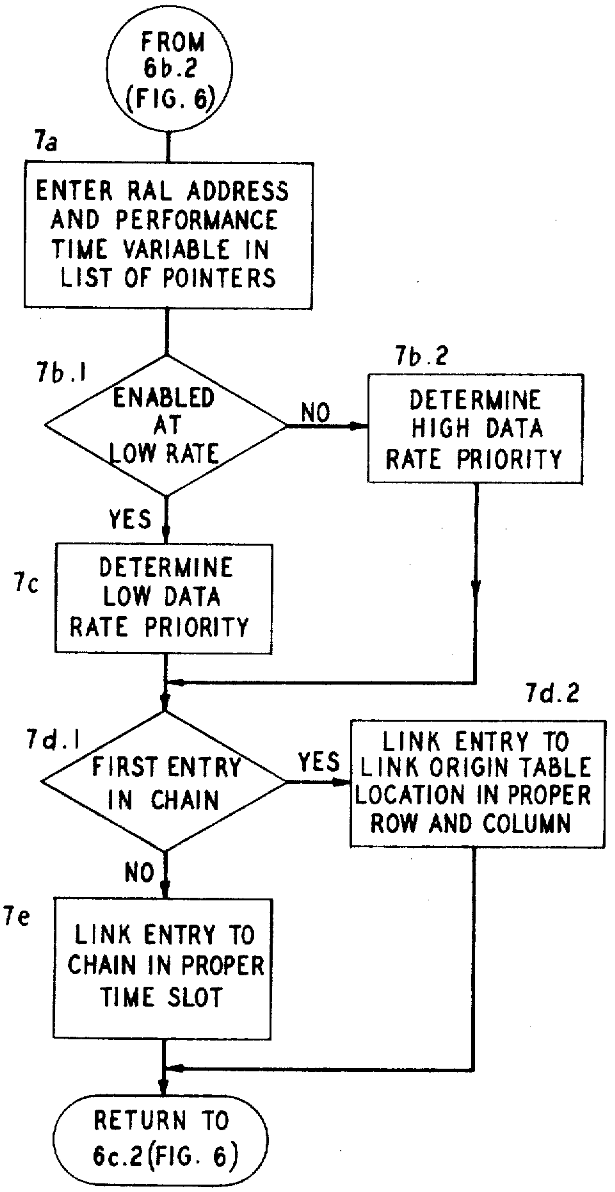

The above is accomplished by a call 6*b*.2 (FIG. 6) to the LINKED subroutine shown in FIG. 7. In the illustrative embodiment LINKED uses the well-known linked list program concept disclosed in the copending application, K. C. Knowlton, U.S. Ser. No. 598,503 filed Dec. 1, 1966. While this concept provides an efficient way of carrying out applicants' invention, it is only one of many ways in which the functions of LINKED may be programmed.

The first operation 7*a* (FIG. 7) performed by the LINKED subroutine is to enter the address $RAL(i)$ (FIG 9A) of the time-enabled radar activity list entry giving rise to the LINKED call in the list of pointers table (FIG. 9B). Simultaneously, the subroutine determines when, during this interval, the enabled operation is to be performed and stores the information as a performance time variable $PT(i)$ in a memory location (FIG. 9B) associated with the operation address pointer. The next step 7*b*.1 is to determine whether the enabled entry is enabled at its high or low data rate. If the entry is enabled at the high data rate the program 7*b*.2 scans a high data rate priority table stored in the computer memory 9 (FIG. 2). Such a table is represented symbolically in FIG. 5B.

When the program finds the same operation in this table as the operation in the radar activity list being processed, it stores the priority information associated with the operation. For instance, if the VERIFY operation in location RAL 2 (FIG. 9A) is being processed and it is enabled at a high data rate, the program would scan the table in FIG. 5B and detect that the number 5 is the priority of the operation. Conversely, if the VERIFY operation had been enabled at the low data rate instead of the high data rate, the program would search 7*c* (FIG. 7) the low data rate priority table in FIG. 5A and detect that the number 2 is the priority ranking for the operation enabled at the low data rate.

After one of the two priority table searches has been completed and the relevant priority indicator determined, the program determines whether this is the first operation in the radar activity list having this priority 7*d*.1. If it is the first such entry, a pointer is entered in the relevant column of the origin table (FIG. 9C). As was indicated earlier the radar used for illustrative purposes has two antenna faces. Additionally, FIG. 4 shows that each radar activity list entry specifies the antenna face to be used along with the other constraints such as wave form, range and angle. Consequently, the pointer is entered in a row of the origin table (FIG. 9C) that is related to the previously determined priority number of the operation in the appropriate radar face column.

For instance, considering the VERIFY operation in location RAL 2 table (FIG. 9A) enabled at a low data rate, it has a priority number 2 (FIG. 5A). By virtue of being time enabled, the operation has resulted in the LINKED subroutine 7*a* (FIG. 7) storing a pointer RAL 2 in location LL1 of the list of pointers table (FIG. 9B). Additionally, the VERIFY operation format contains an F2 entry (FIG. 9A) indicating it is to be performed on antenna face F2 (FIG. 1). Consequently, when the LINKED subroutine detects that no priority 2 entries have been made in the origin table (FIG. 9C) in the F2 column, a pointer LL1 is stored in memory location S2 of that table.

A pointer in the S2 location of this column of the origin table indicates that the VERIFY operation in the radar activity list location RAL 2 (FIG. 9A) has a priority of 2 and is to be performed on antenna face F2. In other words, the LINKED subroutine enters a pointer LL1 in the origin table location S2 (FIG. 9C) that points to location LL1 in the list of pointers (FIG. 9B) which contains a second pointer RAL 2. This second pointer identifies the time-enabled VERIFY operation of priority 2 in the radar activity list (FIG. 9A). At this point, control of the computer is transferred from the LINKED subroutine (FIG. 7) to the SCHEDULE program (FIG. 6) and the next entry in the radar activity list is processed.

For purposes of illustration, assume that the next enabled radar activity list entry is the VERIFY operation in location RAL 4 (FIG. 9A), it is also enabled at the low data rate, and it requires the use of radar face F2. This operation, like the one in RAL 2 (FIG. 9A), will also have a priority number of 2 (FIG. 5A). The program will repeat steps analogous to those described above, entering the pointer RAL 4 and the performance time variable in location LL2 of the list of pointers (FIG. 9B). When the program reaches the first entry test 7*d*.1 in the LINKED subroutine (FIG. 7), it will scan the origin table (FIG. 9C) for previous priority 2 pointer entries in the F2 column.

This time the origin table (FIG. 9C) has an entry LL1 in the priority 2 location S2 for radar face F2. Consequently, the program will begin to construct a time-ordered chain of priority 2 operations. This is accomplished by step 7*e* of the LINKED subroutine (FIG. 7). The subroutine compares the time of performance variables PT1 and PT2 associated with the radar activity address pointers in locations LL1 and LL2 (FIG. 9B). If the latter variable is less than the former, the LL1 pointer in location S2 of the origin table (FIG. 9C) is replaced by LL2. In other words, if the RAL 4 VERIFY operation requires performance before the RAL 2 operation, the tables are altered to insure that the RAL 4 operation will be scheduled before the RAL 2 operation when priority 2 operations are being scheduled. The computation of the performance time variable is accomplished using the rate parameters T(*i*) or I′(*i*) and the contents of the ET(*i*) counters (FIG. 9A). The latter are incremented every time their associated operation is not scheduled and cleared when the operation is scheduled.

An alternative method of detecting when an operation is time enabled is to read a real-time computer clock when an operation is scheduled. The two variables are generated by adding the desired time and minimum time variables (FIG. 9A) for the operation to the clock reading. These two variables are stored in locations associated with the operation and compared with the computer clock reading during each scheduling interval to determine if the operation is time enabled. The use of ET(*i*) counters to detect time-enabled operations is described in the illustrative example since they facilitate a clear and concise description of the aspect of the invention.

However, assuming that the RAL 2 operation requires performance before the RAL 4 operation, the pointer LL1 in location S2 (FIG. 9C) is not changed. Instead the program stores a pointer in location LL1 (FIG. 9B), in addition to the RAL 2 pointer, which points to location LL2 (FIG. 9B). It will be recalled that location LL2 contains the pointer pointing to the time-enabled VERIFY operation, enabled at the low data rate, in location RAL 4 of the radar activity list.

In essence, a time-ordered chain of time-enabled operations having the same priorities is being created. Later, when number 2 priority operations are being scheduled by the computer, the first to be scheduled will be the one whose address is pointed to by the pointer in location S2 of the origin table (FIG. 9C). After this operation is scheduled, the remaining priority 2 operations chained to this initial operation will be scheduled sequentially at the times indicated by their respective time of performance variables. In the above case, the VERIFY operation in location RAL 2 (FIG. 9A) will be scheduled first and then the VERIFY operation in location RAL 4 will be scheduled. These chains will vary in length as the number of time-enabled operations in the radar activity list (FIG. 9A) having the same priority number vary.

The operation of the computer, under control of the LINKED subroutine will be analogous to that described above for all types of time-enabled operations. The LINKED subroutine (FIG. 7) may be thought of as storing and ordering radar activity list address pointers, pointing to time-enabled operations in the radar activity list (FIG. 9A), according to priority and required time of performance. The subroutine LINKED links all radar activity list address pointers of like priority in the list of pointers (FIG. 9B) to form time-ordered chains of addresses pointing to enabled operations in the radar activity list (FIG. 9A). In each chain, the radar activity list address pointers identify operations of like priority and the ordering of radar activity list pointers within the chain is a function of the time at which the respective operations are to be performed during the next performance interval.

After having completed either of the operations described above in discussing the processing of the enabled VERIFY operations, control of the computer is transferred from the LINKED subroutine back to the main flow program SCHEDULE (FIGS. 6). The first thing performed after this transfer of control is a check to see if all the radar activity list entries (FIG. 9A) have been scanned 6*c*.2. If not, the radar activity list address to be scanned is updated 6*c*.1 and the next entry in the radar activity list (FIG. 9A) is checked to see if it is time enabled. If it is, the LINKED subroutine is called again and the operations discussed above are performed again.

The foregoing occurs repetitively until the last radar activity list entry RAL*n* (FIG. 9A) is processed. After this occurs, a time counter, JTIME, and a frame counter, CTN(N), are initialized 6*d* (FIG. 6) in preparation for the actual scheduling of enabled operations. The purpose of these counters is to allow;

(1) the scheduling of $r$ radar frames of operations during each execution of the scheduling program; and (2) the scheduling $g$ of these $r$ frames for each execution of the FRAMED subroutine (FIGS. 8A and 8B) which actually schedules the operations. In other words, for each execution of the scheduling program, a total of $r$ frames of radar operations are scheduled and $g$ frames of these operations are scheduled each time the FRAMED subroutine is called.

This method of scheduling reduces the number of times the FRAMED subroutine has to scan the origin table (FIG. 9C) by a factor of $g$ and this, in turn, reduces the execution time of the subroutine. Depending on the radar and the types of operation being scheduled, some multiple of $r$ operations may be scheduled where more than one operation per frame may be performed. The time between executions of the scheduling program is a function of the number $r$.

For purposes of illustration, $r$ has been chosen to be 20 and $g$ has been chosen to be 4. Thus, the scheduling program schedules 20 frames of radar operations each time it is executed. In scheduling these 20 frames, the FRAMED subroutine is executed 5 times. In terms of time, if one second in radar time is required to perform 20 frames, the foregoing may be thought of as scheduling the next second's work for the radar.

After the frame and time counters have been initialized *6d* (FIG. 6), the time counter JTIME is incremented by $k$ in step *6e*. The value $k$ in this counter is used by the FRAMED subroutine (FIGS. 8A and 8B) in determining which enabled radar activity list entries are to be schedules on its initial execution. If the 20 frames to be scheduled require one second in radar time and they are scheduled 4 frames at a time, $k$=200 (milliseconds) for the first execution of the subroutine FRAMED in a scheduling interval.

The next step is a call to the subroutine FRAMED *6f* (FIG. 6). This subroutine is shown in flow diagram form in FIGS. 8A and 8B. The first step *8a* (FIGS. 8A and 8B) in the subroutine is to initialize a counter L. This counter is used to allow the FRAMED subroutine to schedule $g$ frames at a time. As indicated above, the number $g$ was chosen as 4 for the purposes of illustration. Consequently, a 4 is stored in L and each time the FRAMED subroutine (FIGS. 8A and 8B) is executed, it schedules 4 frames of operation. Each of the operations scheduled in these 4 frames is such that it requires performance in the next $k$ seconds. As indicated above, $k$ is the time required to perform the 4 frames and the total number of frames being scheduled require 5$k$ seconds for performance. The next step *8b* is to determine if the counter L contains O.

Obviously, on the first pass, it will not contain O since the number 4 has just been stored in L. Consequently, the next steps *8c*.1 and *8c*.2 are to check to see if the end of the entries in the origin table pointers (FIG. 9C) has been reached and, if not, to scan the locations of the origin table (FIG. 9C) for a pointer entry.

From the preceding discussion of the LINKED subroutine, the S1 location in the origin table (FIG. 9C) has no entry, or it contains "0," and the S2 location contains a pointer LL1 which is a location in the list of pointers table (FIG. 9B). The LL1 location of the pointer list contains two pointers, one being RAL 2 and the other being LL2. The former pointer points to the enabled VERIFY operation having a priority 2 in the radar activity list (FIG. 9A) which is to be scheduled for performance and the latter pointer points to a second location in the pointer list (FIG. 9B) containing yet another pointer RAL 4. The RAL 4 pointer points to the second enabled VERIFY operation of priority 2 in the chain which is also to be scheduled for performance.

A "0" entry in location S1 of the origin table (FIG. 9C) results in the FRAMED subroutine (FIGS. 8A and 8B) advancing to location S2. The presence of the LL1 pointer in this location results in the FRAMED subroutine processing the priority 2 enabled operations *8c*.2 to be performed on antenna face F2 (FIG. 1) of the radar. In this case, FRAMED uses the pointer LL1 in location S2 (FIG. 9C) to examine the contents of location LL1 in the list of pointers table (FIG. 9B). Assuming that the RAL 2 (FIG. 9A) VERIFY operation specifies a maximum time between performances of $T2$=100 and its elapsed counter $ET2$=50, indicating the operation has not been performed for 50 milliseconds, the operation's performance time parameter $PT1$=50 (FIG. 5B). That is, the VERIFY operation requires performance within the next 50 milliseconds. The program compares the performance time parameter $PT1$=50, inserted in the table by the LINKED subroutine with the contents $k$ of the JTIME counter *8d*.

If 50 is greater than $K$, this means the VERIFY operation identified by the RAL 2 pointer in location LL1 (FIG. 9B) is not due for performance in the next 4 frames being scheduled during this execution of FRAMED. Since the pointer chains are time ordered, none of the operations represented by the remaining pointers in the chain will require scheduling this execution of FRAMED. Thus, the program returns to find another enabled entry pointer *8c*.2. This pointer will be in the next lower priority pointer chain if such a chain of pointers exists.

In the present case, the next chain would be the priority 3 chain. Assuming none of the enabled entries represented by the chains of pointers satisfy the inequality *8d*, the last pointer in the lowest priority chain is processed without being scheduled. This time, when the program reaches step *8c*.1, there is an end of origin table pointers indication and control of the computer is returned to step *6g* (FIG. 6) of the SCHEDULED program and the JTIME counter is incremented by $k$ in step *6e*. Then, the FRAMED subroutine is called again *6f* and the above process is repeated with JTIME equals 2$k$.

However, it was assumed for purposes of illustration that $k$=200. Consequently, the performance time variable $PT1$=50, associated with location LL1 (FIG. 9B), is less than $k$. When the step *8d* (FIGS. 8A and 8B) inequality is satisfied, the VERIFY operation identified by the enabled entry pointer RAL 2 in location LL1 (FIG. 9B) is to be scheduled during this execution in FRAMED. The FRAMED subroutine *8e* utilizes the RAL 2 pointer in location LL1 of the list of pointers (FIG. 9B) to transfer the radar related information in location RAL 2 of the radar activity list (FIG. 9A) to an output buffer 11 (FIG. 2) location. More particularly, this includes a transfer of the operation code and the information in the last four columns of the radar activity list table (FIG. 9A).

At the same time, the elapsed time counter ET2 (FIG. 9A) is initialized to indicate that the RAL 2 VERIFY operation has been scheduled for performance. Similarly, the second pointer, LL2, in location LL1 (FIG. 9B) is transferred to location S2 (FIG. 9C). After this has occurred, the time parameters T2 and T'2 (FIG. 9A) associated with the VERIFY operation in location RAL 2 of the radar activity list are checked *8f*.1 (FIGS. 8A and 8B) to see if this operation will be enabled again this interval. If so, the LINKED subroutine is called *8f*.2 and a pointer pointing to the operation is attached to the chain of pointers representing operations of like priorities. The computer operations performed in accomplishing a second entry of the RAL 2 pointer, in the list of pointers (FIG. 9B) for a given execution of the scheduling program, are analogous to those described in the above discussion of the LINKED subroutine.

The next step *8g*.1 in scheduling, whether or not the LINKED subroutine is called, is to determine if the operation scheduled uses the first pulse in the radar frame and, if it does, determine *8h*.1 if the radar constraints allow the scheduling of another operation during this same frame. For purposes of illustration, it has been assumed that the radar allows one long duration pulse per frame and two short duration pulses per frame as long as both short pulses utilize the same antenna face.

If the scheduled operation pulse is the first pulse in the frame and it requires a short duration pulse, the FRAMED subroutine *8h*.2 (FIGS. 8A and 8B) begins to search the origin table (FIG. 9C) entries for another short duration pulse operation requiring performance in the next $k$ seconds of the same antenna face as the first pulse. If such an operation is found, that operation is scheduled for performance 8$j$, its ET($i$) counter is initialized and its pointer is removed from the chain. Additionally, the operation is checked 8$k$ to see if it will be enabled again during the scheduling interval and if it will be, the LINKED subroutine is called 8$m$ and the operation is linked to a pointer chain in the appropriate time slot. The operations performed in steps 8$j$ through 8$m$ are analogous to those described above in discussing steps 8$e$ through 8$f$.2.

Alternatively, if the scheduled operation is not the first operation in the frame, or if it requires a long duration pulse, the exit from decision elements 8$g$.1 and 8$h$.1 (FIGS. 8A and 8B) indicate that the frame counter CTN(N) is incremented by 1 and the L counter is decremented by 1 in step 8$g$.2. After completing this updating of counters, the program returns to step 8$b$ and tests the L counter for "0." Similarly, if the program searches for a second pulse and does not find it, 8$i$, or does find it, schedules it and completes the required housekeeping 8$k$, the program also returns to step 8$b$ via step 8$g$.2.

For the case where the L counter contents are not 0, the subroutine 8$c$.2 (FIGS. 8A and 8B) returns to location S2 of the origin table (FIG. 9C). In this case, it finds the pointer LL2 which replaced the original pointer LL1. Using this pointer FRAMED examines the RAL 4 VERIFY operation and schedules it for performance if its performance time parameter PT2 (FIG. 9B) indicates that it needs service during the interval $k$. The computer operations performed in scheduling the RAL 4 VERIFY operation are analogous to those discussed above in describing the scheduling of the RAL 2 VERIFY operation.

If there are no other pointers in the priority 2 chain, the S2 location in the origin table (FIG. 9C) will be "0" and the FRAMED subroutine (FIGS. 8A and 8B) will go to the next location in that table which contains the nonzero entry and repeat the above process. If the number of enabled operations for performance in the interval $k$ is less than 4, the end of the origin table entries will be reached before the counter L 8$b$ (FIGS. 8A and 8B) equals 0, and control of the computer is returned to the SCHEDULED program 8$c$.1 at point 6$g$ (FIG. 6).

Control of the computer is also returned to the SCHEDULE program (FIG. 6) at step 6$g$ when the FRAMED subroutine has scheduled 4 frames of operations during an execution. After the fourth frame is scheduled, the L counter contains 0. Upon returning to step 8$b$ (FIGS. 8A and 8B), control of the computer will be transferred from FRAMED to the SCHEDULE program (FIG. 6). Upon regaining control of the computer, the SCHEDULE program tests the frame counter CTN(N) 6$g$ to see if it equals 20. If the counter content does not equal 20, the scheduling of 20 frames has not been completed. The next step is to increment the JTIME counter 6$e$, which as indicated above, is used in scheduling 4 frames per execution of the subroutine FRAMED.

The subroutine FRAMED is then called again and the above operations, discussed with regard to FRAMED, are repeated. Scanning of the origin table (FIG. 9C) begins again with a 2$k$ value in the JTIME counter and this time operations requiring performance in some period less than or equal to 2$k$ milliseconds in the future are scheduled. In the illustrative example, where $k$=200, the JTIME counter would contain 400 on the second execution of FRAMED. This entire process is repeated incrementing the JTIME counter by $k$ every time control of the computer returns to the program SCHEDULE until the counter equals 1000. After FRAMED is executed with JTIME=1000, the counter CTN(N) will equal 20, indicating 20 operations have been scheduled, or the end of the origin table pointers has been reached, and control of the computer is returned to the data analysis program 3$a$ (FIG. 3).

The foregoing has shown the various operations the computer performs while under the control of the SCHEDULE program (FIG. 6) which includes the LINKED (FIG. 7) and FRAMED (FIGS. 8A and 8B) subroutines. This operation may be summarized as follows: The computer scans the radar activity list operation entries (FIG. 9A) and detects the time-enabled operation entries. Radar activity list address pointers representing the enabled operations addresses are entered in the list of pointers (FIG. 9B). These enabled operations are further examined as they are detected to determine if they are enabled at the high data rate or low data rate and when, during the current scheduling interval, they require performance. If an operation is enabled at a high data rate, the computer determines its priority by scanning a high data rate priority table (FIG. 5B). Similarly, if the entry is enabled at its low data rate, the low data rate priority table (FIG. 5A) is scanned. A pointer pointing to the operation's address pointer in the list of pointers (FIG. 9B) is then entered in the origin table (FIG. 9C) at a location related to the operation's priority if it is the first operation of this priority encountered during this scheduling period. If the operation is not the first having such a priority, its address pointer is entered in a time ordered chain of pointers, previously stored in either the list of pointers table (FIG. 9B) or the origin table (FIG. 9C), that all identify operations of the same priority. After all the enabled operations have been identified by pointers in the tables, the computer begins scanning the pointers in the origin table (FIG. 9C), from highest to lowest priority, and schedules these entries and entries of equal priority chained to them on the basis of priority ranking and the indicated required time of performance. As the various entries are scheduled, they are stored in an output buffer 11 (FIG. 2) which supplies them to the radar system 3 (FIG. 1) sequentially for performance.

The foregoing has emphasized the data processing steps in the flow of the illustrative program SCHEDULE (FIG. 6) as a foundation for a more thorough discussion of the scheduling strategy. To insure a complete understanding of the interplay between the radar activity list load, the data rate at which various operations are enabled, and the scheduling of the various enabled operations on a multiple priority basis, a detailed example of the scheduling strategy will be discussed.

Suppose, the SEARCH operation in location RAL$n$ of the radar activity list (FIG. 9A) has a maximum of time of 2 seconds, a desired time of 0.5 seconds and the ET$n$ counter contents equal 0.6. In other words, this operation is to be performed every 0.5 seconds, if possible, and should be performed approximately every 2 seconds if the data resulting from its performance is to be meaningful. Additionally, ET$n$=0.6 indicates that the operation is enabled at its high data rate and, therefore, it is to be assigned the lower of the two search priorities (FIG. 5B). One further assumption is made, and that is, the scheduling program is executed every second and schedules operations to be performed by the radar in the following second.

When the scheduling program takes control of the computer to schedule future operations, the main flow, SCHEDULE (FIG. 6), initializes the origin table (FIG. 9E) in step 6$a$. The program then begins to scan the radar activity list (FIG. 9A) for time-enabled entries and calls the LINKED subroutine when such an entry is detected. The details of the computer operation were previously described above in conjunction with the discussion of the SCHEDULE and LINKED programs.

It is assumed that the number of time-enabled operations entries in the radar activity list is such that all of these operations can be scheduled at their desired rates in the next second. The radar activity list pointers for these operations will be entered in the list of pointers (FIG. 9D). The subroutine LINKED (FIG. 7) then links each set of address pointers in the same priority class on a time-ordered basis using the list of pointers address pointers. The list of pointers address pointers for the operation address requiring service first in each priority class are all entered in selected locations of the origin table (FIG. 9E). These pointers in the origin table are then linked to pointer chains of like priority classes contained in the list of pointers (FIG. 9B).

Conditions may be such that there is a pointer in origin table location S4 of column F1 (FIG. 9E) pointing to a radar activity list address pointer in the list of pointers table location LL5 (FIG. 9D). The radar activity list pointer in location LL5 (FIG. 9D) identifies the TRACK operation in location RAL 6 (FIG. 9A). The RAL 6 pointer in the list of pointers tables is also chained to another radar activity list address pointer in the table by means of an associated list of pointers address pointer LL6 in the chain pointer column (FIG. 9D). It is possible to have a plurality of radar activity list address pointers, in the list of pointers table (FIG. 9D), chained together in this manner. It will be recalled that the origin pointer LL5 in location S4 of the origin table (FIG. 9E) indicates the priority of the operations in the chain while the position of the operations in the chain represent the times at which the operations are to be performed.

A similar chain of pointers, pointing to enabled VERIFY operation entries in the radar activity list, exists having the origin pointer LL1 (FIG. 9E) stored in location S5 (FIG. 9E) under column F2. Additionally, a chain of pointers for enabled SEARCH operations, including the RAL*n* SEARCH operation (FIG. 9A) with a desired performance time of 0.5 seconds, has an origin pointer LL*m* in location S6 (FIG. 9E) of the origin table in column F1.

The origin pointer in location S4 of the origin table (FIG. 9E) indicates at least one enabled TRACK operation is enabled at the high data rate. Referring to FIG. 5B, a TRACK operation enabled at its high data rate has a priority 4. Similarly, the origin pointers for the VERIFY and SEARCH operation chains in locations S5 and S6 of the origin table (FIG. 9E) indicate these operations are enabled at their high data rates and have priorities of 5 and 6 (FIG. 5B) respectively.

The priority determination, time of performance determination, and creation of the time-ordered homogenous priority chains shown in the list of pointers (FIG. 9D) and the origin table (FIG. 9E) are all performed by the computer under the control of the LINKED subroutine (FIG. 7).

Control of the computer passes from the LINKED subroutine back to the main flow, SCHEDULE (FIG. 6), after the foregoing has been completed. The program, SCHEDULE, performs the housekeeping discussed above and calls the FRAMED subroutine which actually schedules the time-enabled operations.

The FRAMED subroutine begins by scanning the locations of the origin table (FIG. 9E). In locations S1 through S3, it encounters "0" and this results in the program continuing to location S4. When the pointer LL5 is encountered, the program uses the performance time variable $k-1$ (FIG. 9D) associated with the LL5 address in the list of pointers table to determine if the operation designated by the pointer RAL 6 requires scheduling in the next $k$ seconds. In other words, the program determines if the TRACK operation contained in radar activity list location RAL 6 (FIG. 9A) should be scheduled during this scheduling of 4 frames. Returning to FIG. 9D, the performance time variable associated with LL5 is $k-1$, which is less then $k$. Consequently, the RAL 6 TRACK operation requires scheduling at this time and the FRAMED subroutine schedules it for performance on face F1 (FIG. 1) of the radar.

When the RAL 6 TRACK operation has been scheduled, the pointer LL6, also associated with the list of pointers table address LL5 (FIG. 9D), is stored in location S4 of the origin table (FIG. 9C) by FRAMED, replacing the pointer LL5. The FRAMED subroutine then checks the performance time variable associated with the list of pointers table address LL6 (FIG. 9D) to see if the RAL 7 TRACK (FIG. 9A) operation requires scheduling during this execution of FRAMED. Since the performance time variable is $k+1$ (FIG. 9D), the TRACK operation does not require scheduling during this execution of FRAMED. This TRACK operation will be scheduled on the next execution of FRAMED when the JTIME counter 8*e* (FIGS. 8A and 8B) has been incremented and equals $2k$.

Figure 8A:
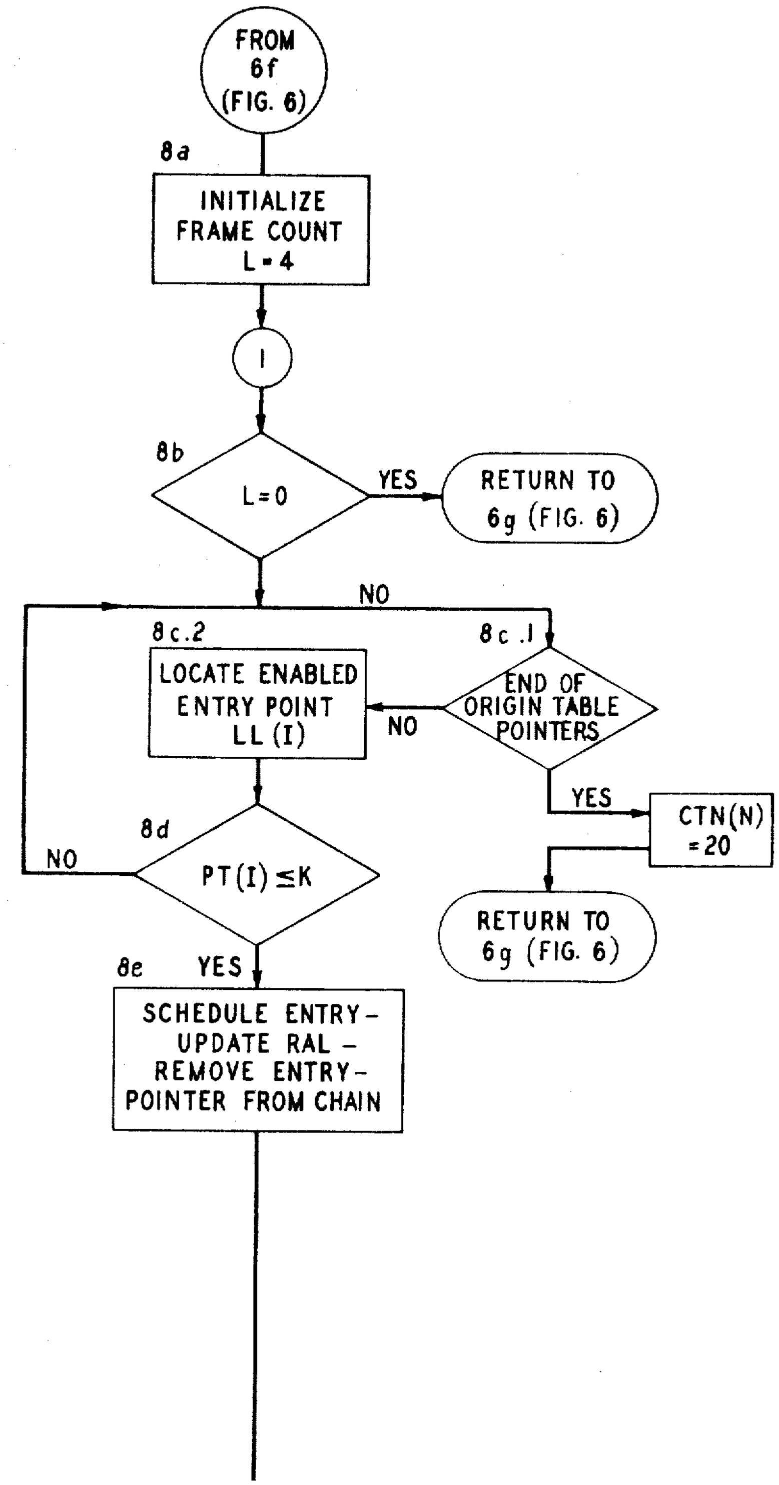
Figure 8B:
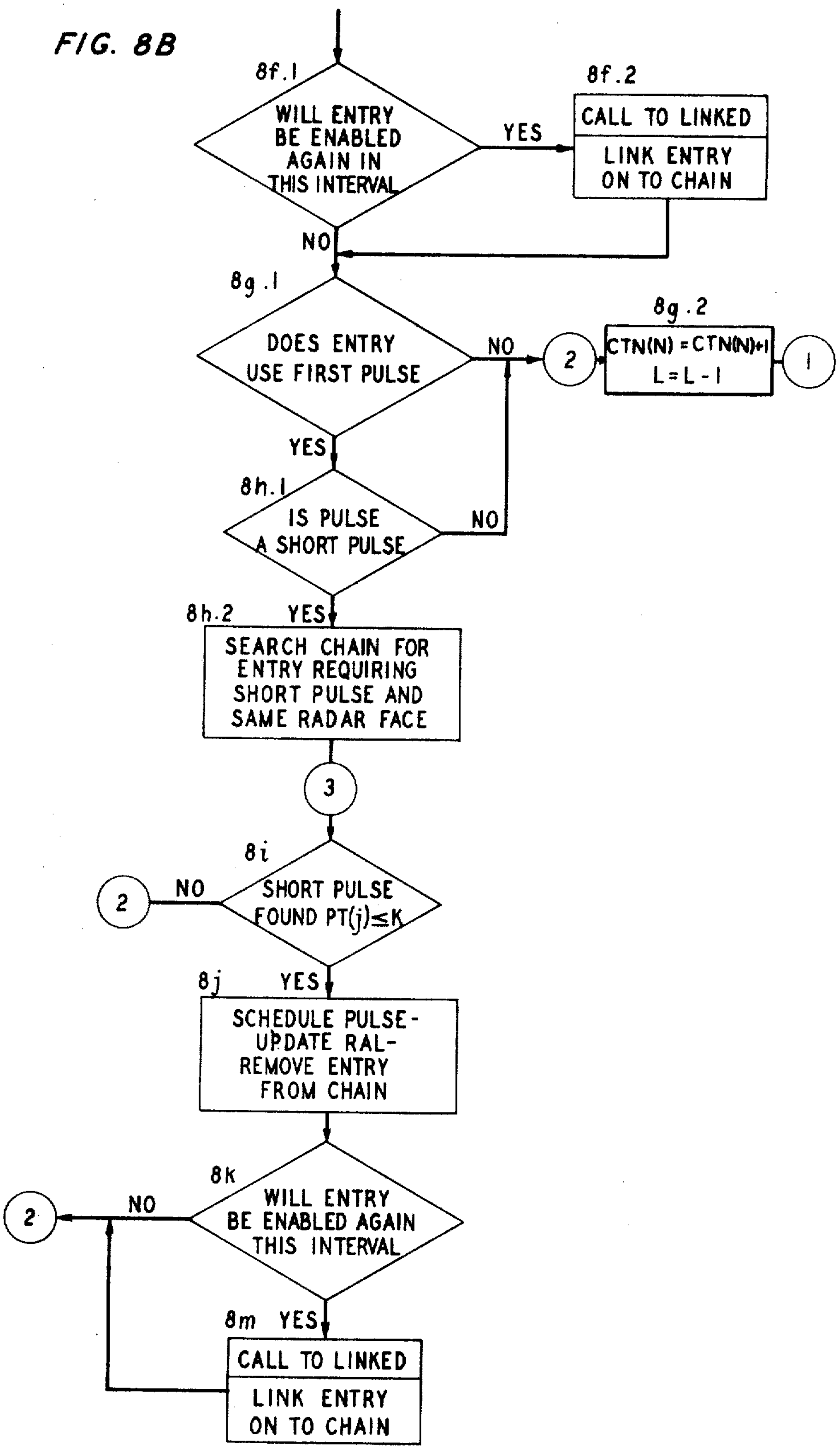

While only two enabled TRACK operation pointers RAL 6 and RAL 7 (FIG. 9A) are specifically shown in the list of pointers table (FIG. 9D), it is clear that there could be a long chain of such pointers. In this case, the FRAMED subroutine merely repeats the above process for each TRACK entry pointer in the chain, scheduling those whose performance time variable is less than the contents of the JTIME counter 8*e* (FIGS. 8A and 8B).

After encountering the second pointer LL6 in location S4 (FIG. 9E) and determining that the TRACK operation it identifies does not require scheduling during this execution of FRAMED, the subroutine begins scanning the origin table locations again. This time it will encounter the LL1 pointer in location S5 (FIG. 9E) which is to be scheduled for performance on face F2 (FIG. 1) of the radar.

When the LL1 pointer is encountered, the FRAMED subroutine checks the performance time variable $k-3$ associated with the list of pointers table address LL1 (FIG. 9D). Since this variable is less than $k$ the VERIFY operation in radar activity list location RAL 2 (FIG. 9A) is scheduled. The program then replaces the LL1 in location S5 (FIG. 9E) with the chain pointer LL3 associated with the list of pointers table address LL1 (FIG. 9D).

The FRAMED subroutine then performs the same operations on the data in list of pointers location LL3 (FIG. 9D) as it did for that in LL1. Since the LL3 performance time variable $k-2$ is less than $k$, this VERIFY operation will also be scheduled during this execution of FRAMED.

Execution of the FRAMED subroutine will continue, with control of the computer periodically returning to SCHEDULE (FIG. 6) where the contents of the JTIME counter is incremented and FRAMED is again called. When the JTIME counter has been incremented to $2k$, the operation identified by the LL6 pointer, which replaced LL5 in location S4 of the origin table (FIG. 9E), will be scheduled since its performance time variable $k+1$ (FIG. 9D) is less than the contents of the JTIME counter. Eventually the JTIME counter will be incremented to $3k$. When this occurs, FRAMED will begin scanning the origin table (FIG. 9C) again, scheduling operations with performance time variables less than or equal to $3k$. It will encounter the pointer LL*m* in location S6. Location LL*m* in the list of pointers table (FIG. 9D) contains a pointer RAL*n* to an enabled SEARCH operation. This SEARCH operation has a performance time variable equal to $2.5k$ indicating a desired performance of twice a second. This SEARCH operation will be scheduled in the same manner as described above. Additionally, its pointer RAL*n* will be reinserted in the chain by the LINKED subroutine for scheduling at the end of the 1-second interval being scheduled. The details of this operation are discussed above in the section describing the operation of subroutine LINKED (FIG. 7).

FRAMED will repeat the above process, scheduling in order of priority, those operations having performance time variables less than or equal to the contents of the JTIME counter on each execution. This is a repetitive process that continues until FRAMED has scheduled either 20 frames of radar operations or all the enabled operations if less than 20 are enabled. At this point one scheduling interval is completed.

The foregoing has shown how, when the load of enabled operations is not heavy, all of these operations are scheduled at these desired, or high, rates of performance. Thus, in the specific example of the SEARCH operation having a desired rate of 0.5 seconds and a low rate of 2 seconds, where scheduling occurs 1 time per second, the SEARCH operation takes on a priority 6 (FIG. 5B) and is scheduled twice a second.

It is clear that a sufficient increase in the number of enabled higher priority TRACK and VERIFY operations will result in the lower priority SEARCH operations not being scheduled during an interval even though they are enabled. An example of this is the case where 20 frames are being scheduled during each scheduling operation and there are enough higher priority TRACK and VERIFY operations to use all 20 frames.

In the event that the foregoing condition exists during a scheduling operation and the RAL$n$ SEARCH operation (FIG. 9A) is not performed, its elapsed time counter ET$n$ will reflect this when the next scheduling operation occurs. For the case under consideration, the ET$n$ counter for the SEARCH operation will indicate that more than 1 second has elapsed since the SEARCH operation was last performed when the LINKED (FIG. 7) subroutine processes the operation during the next scheduling operation. Since the RAL$n$ SEARCH operation is to be performed approximately every 2 seconds, it should be scheduled during this scheduling interval to keep its performance rate from dropping below its specified low data rate. Consequently, the LINKED subroutine treats the SEARCH operation as being enabled at its low data rate and uses the low data rate table (FIG. 5A) in determining its priority.

Referring to FIG. 5A, the low data rate priority for SEARCH operation is 3. Assuming the RAL$n$ SEARCH operation is the longest overdue, the LINKED subroutine will store a pointer LL$m$ in location S3 (FIG. 10) of the origin table. Pointers for the other operations will be stored in the same locations S4 and S5 as they occupied before if they are still being performed at their desired rates.

The foregoing shows how the LINKED subroutine changes the placement of an operations pointer in the origin table as a result of the operation being time enabled at its low data rate instead of its high data rate. This change in the location of the SEARCH operation pointer is, in essence, a change in its priority for the current scheduling operation.

After LINKED has finished processing the enabled radar activity list (FIG. 9A) operation entries, the origin table will contain pointers in the locations shown in FIG. 10. When the FRAMED subroutine begins to scan this table, the LL$m$ pointer in location S3 (FIG. 10) will be the first pointer it encounters. Consequently, FRAMED will schedule the operation identified by the RAL$n$ pointer stored in the list of pointers table (FIG. 9D) location LL$m$. In other words, the SEARCH operation in the radar activity list location RAL$n$ (FIG. 9A) will be the first operation scheduled during this scheduling operation.

After the scheduling of this operation, the remaining operations will be scheduled as previously explained. In essence, the scheduling program has raised the priority of the SEARCH operation to insure that it is scheduled at its low data rate, even though the operation would not have been scheduled if it had been enabled at its high data rate. Instead of not being scheduled, as would be the case in the prior art, the SEARCH operation is being scheduled at a reduced rate sufficient to supply meaningful data.

If the number of enabled operations continues to rise, a point will be reached where all operations are enabled at their low data rates. An example of the origin table showing the location of pointers for this case is shown in FIG. 11. The low data rate priorities for TRACK, VERIFY and SEARCH operations are 1, 2, and 3, respectively (FIG. 5A). The placement of pointers in FIG. 11 reflects the relative priority. Comparing FIG. 11 with FIG. 9E, it will be noted that relative priorities are identical. In other words, TRACK operations again have the highest priority, VERIFY the next, and SEARCH the lowest priority. This is to be expected since all the operations are now being scheduled at their low data rate and all priorities are being assigned from the same priority table (FIG. 5A).

Referring to FIG. 11, if the number of priority 1 and 2 operations, represented by the LL5 and LL1 pointers in locations S1 and S2, increase to a certain point, there will be no time to schedule the priority 3 operations represented by the pointer LL$n$. In other words, if enough TRACK and VERIFY operations are enabled at their low data rates during each scheduling operation, the SEARCH operations will not get performed. However, such preemption of performance of lower priority operations occurs only under conditions of extreme loading.

A FORTRAN IV program listing implementing applicants' invention for performance on any general purpose data processor such as the GE-635 computer system is included in an appendix to the disclosure. Given this listing, a user need only transfer the coding to cards, supplying the performance time parameters and radar variables associated with the radar being used, to have an operational scheduling program for use on the GE-635 system.

The foregoing discussion has shown how, for normal loads, the computer system 2 (FIG. 2) schedules time-enabling operations at their desired data rates on the basis of high data rate priority table (FIG. 5B). As the load increases, some of the lower priority operations will not be performed at their high data rate. However, the computer periodically assigns such operations a priority from a low data rate priority table (FIG. 5A) that exceeds the priority of operations being performed at their desired rate. This results in the operations overdue for performance being scheduled at a reduced rate.

In other words, the computer periodically alters the assigned priority of selected operations on the basis of their history of performance over a selected interval. The scheduling of lower priority operations is preempted only when all time-enabled higher priority operations are being scheduled at a reduced rate and there are enough of the latter operations to fill the output buffer 11 (FIG. 2) every scheduling period.

CONCLUSION

The description of the illustrative embodiment has shown that scheduling operations on the basis of a priority ranking which is a function of the rate at which the operations are being performed allows more efficient use of a computer-controlled real-time system. While the scheduling strategy was described in terms of scheduling operations for a computer-controlled radar system, the strategy is by no means limited to use in such a system. It is readily adaptable for use in any real-time traffic-handling system that utilizes priority as a basis for scheduling operations. The scheduling strategy may be implemented in a system using a programmable computer by means of a program or it may be implemented using special purpose circuitry.

In light of the disclosure, numerous other features adaptations and uses, all being within the spirit and scope of the invention, will be readily apparent to one skilled in the art of data processing. Such adaptations and uses are anticipated due to the general utility of the invention.

What we claim is:

1. In a real-time traffic-handling system which schedules the performance of operations on a priority basis;
   - means for generating an elapsed time variable indicating the time elapsed since the last performance of each operation; and
   - means responsive to selected values of said elapsed time variable for altering the priority of said operation.

2. In a real-time system utilized for performing operations whose formats include a plurality of rate parameters having selected values, circuitry comprising;
   - monitor means for monitoring the elapsed time since the last performance of each of said plurality of operations; and
   - means responsive to said monitor means for altering the performance rate of any operation when the elapsed time for that operation is greater than or equal to a selected one of its rate parameters.

3. In combination;
   - means for generating a plurality of operation commands;
   - means for scheduling said commands for performance on the basis of a set of predetermined operation priorities;
   - monitoring means for determining the rate at which each of said commands are being scheduled for performance; and
   - means responsive to said monitoring means for varying the priority of each of said commands as a function of the past performance rate of the operation the command represents.

4. The combination of claim 3 wherein the scheduling means further comprises;

means for detecting the priorities associated with each of said operation commands.

means responsive to the detected priorities for combining said plurality of operation commands of like priority into sets; and means for transferring selected portions of said operation commands from said sets to an output storage means in a selected sequence.

5. The combination of claim 3 wherein said means for varying priority further comprises;

a storage means;

a plurality of priority hierarchies stored in selected locations of said storage means in the form of coded priority tables;

means for detecting the past performance rate of each operation represented by said operation commands;

means responsive to the detected performance rate of an operation for associating a coded priority indicator from a selected one of said coded priority tables with the operation command representing said operation.

6. In combination;

means for generating a plurality of operation code signals, each of such code signals including a plurality of rate parameters;

means for repetitively performing the operations represented by said code signals;

means for monitoring the rate of performance of each of said operations;

comparator means for periodically comparing each monitored rate with selected ones of its respective operation's rate parameters; and means responsive to said comparator for altering the performance rates of each of said operations as a function of the results of said comparison.

7. In a real-time traffic-handling system, circuitry for altering operation priorities as a function of operation load comprising;

means for storing a plurality of coded priority hierarchies;

means for monitoring the performance rate of each of the operations being performed;

means for associating a priority indicator in a selected one of said plurality of stored priority hierarchies with each of said operations on the basis of said operation's respective performance rate.

8. In a real-time system that repetitively performs selected operations whose coded formats include a desired time between performances and a maximum time between performances parameters, circuitry comprising;

a storage means containing a first and a second coded priority table;

means for monitoring the elapsed time since the last performance of each operation;

means for periodically comparing said elapsed time for each operation with the desired and maximum time parameters in the operation's coded format; and means responsive to a comparison indicating a selected relationship between said elapsed time and desired time parameter for associating a selected priority indicator from said first priority table with the coded format representing said operation.

9. The real-time system of claim 8 further comprising;

means responsive to a comparison indicating a selected relationship between said elapsed time and maximum time parameter for associating a selected priority indicator from said second priority table with the coded format representing said operation.

10. The real-time system of claim 8 further comprising;

means for determining the required time of performance of each operation from said elapsed time and a selected one of said time between performances parameters;

storage means for storing said coded formats in sets on the basis of their associated priorities; and means responsive to the required times of performance for ordering the coded formats that are members of any given set in said storage means on the basis of the respective required times of performance of the member formats.

11. A data processing method for scheduling a plurality of operations in a real-time system comprising the steps of;

1. monitoring the rate at which each operation is scheduled for performance during a selected interval; and 2. altering the future scheduling of selected operations as a function of the information obtained in step (1).

12. A data processing method for scheduling operations in a real-time system comprising the steps of;

1. determining, at selected intervals, the elapsed time since the last scheduling of an operation having an associated first priority; and 2. replacing said first priority with a second priority when said elapsed time equals a selected value.

13. A computer program for scheduling operations in a real-time system comprising the steps of;

1. scanning a plurality of coded operation entries in a table at selected intervals;

2. determining when each of said operations was last performed by means of elapsed time counts associated with said operations; and 3. scheduling said operations for performance in an order that is a function of the results of step (2).

14. A computer program for scheduling operations for performance comprising the steps of;

1. scanning a table in the computer memory containing a plurality of operation codes, where each operation code has an elapsed time variable and performance rate variables associated with it;

2. determining at which performance rate each operation is enabled using the elapsed time variable and selected performance rate variables associated with said operation's operation code;

3. scanning one of a plurality of priority hierarchy tables stored in said computer memory for the priority assigned to said operation, where the priority table scanned is determined by the results of step (2); and 4. associating the priority found in step (3) with the operation code of said operation for purposes of scheduling.

15. A computer program for scheduling operations for performance comprising the steps of;

1. detecting time-enabled operation codes stored in a table in the computer memory, which include time and rate of performance information;

2. identifying said enabled operation codes with a set of identifiers stored in a second table in said computer memory;

3. determining the performance rates at which said time-enabled operation codes are enabled;

4. determining the priorities to be associated with said operation codes on the basis of the results in step (3); and 5. generating a plurality of identifier sets from said identifiers in said second table where identifiers in a given set identify operations having the same priority.

16. The computer program of claim 15 wherein step (3) further comprises determining the times at which said operations, represented by said operation codes, require performance; and step (5) further comprises the ordering of identifiers in each of said sets in accordance with their respective operations required performance times.

UNITED STATES PATENT OFFICE

Certificate of Correction

Patent No. 3,587,054 June 22, 1971

Edward R. Byrne et al.

It is certified that error appears in the above-identified patent and that said Letters Patent are hereby corrected as shown below.

Column 20, before the claims insert the following:

18-22-68

APPENDIX A

```
      SUBROUTINE SCHED
      INTEGER QUEUE,FRAME
      COMMON /QUEUE/QUEUE(200,11)
      COMMON /ITIME/ITIME
      COMMON /NPIX/NPIX
      COMMON /CHAIN/IADDR(1000),IRAME(40,2),LINK(4,40),II(40)
      DATA XXX/3HXXX/

      DO 3I=1,4
      DO 3J=1,40
 3    LINK(I,J)=0


      N=1
      J=1
 5    IF(QUEUE(J,1).EQ.0) GOTO 20
      IF(QUEUE(J,1)+1) 9,10,9
 9    IF((QUEUE(J,7)+QUEUE(J,8).GT.ITIME+1000) AND.(QUEUE(J,7)+QUEUE(J,1
     20).GT.ITIME+1000)) GO TO 10
      CALL   LINKED(J)
 10   J=J+1
      GOTO 5
C     PCL HAS BEEN CREATED AS A LINKED LIST
C     FROM THE RAL,NOW PROCEED TO MAKE-UP
C     FRAMES FROM PCL.WE SEARCH PCL FROM
C     HIGH PRIORITY TO LOW PRIORITY PICKING OFF
C     ENTRIES WHICH WILL FIT IN NEXT 4 FRAMES
C     SUBROUTINE FRAMED WILL FIND ENTRIES FOR
C     FRAME.
 20   JTIM=ITIME
 21   JTIM=JTIM+100
      CALL FRAMED(JTIM,N)
      IF(N.LE.40)GOTO21

C     PRINT OUT ALLOCATION
      WRITE(6,90)
      DO 400 N=1,40,2
      IF (IRAME(N,1).NE.0) GO TO 310
      NP1 = 0
      NP2 = 0
      GO TO 340

  310 NP1 = IRAME(N,1)
      IF (IRAME(N,2).EQ.0) GO TO 320
      NP2 = IRAME(N,2)
      GO TO 340

  320 IF (QUEUE(NP1,6).EQ.0) GO TO 330
      NP2 = -NP1
      GO TO 340
```

APPENDIX A

```
8-22-68

  330 NP2 = 0

  340 CONTINUE

      NP5 = N+1
      IF (IRAME(NP5,1).NE.0) GO TO 350
      NP3 = 0
      NP4 = 0
      GO TO 380

  350 NP3 = IRAME (NP5,1)
      IF (IRAME(NP5,2).EQ.0) GO TO 360
      NP4 = IRAME (NP5,2)
      GO TO 380

  360 IF (QUEUE(NP3,6).EQ.0) GO TO 370
      NP4 = -NP3
      GO TO 380

  370 NP4 = 0
  380 CONTINUE

      WRITE(6,100)N,NP1,NP2,NP5,NP3,NP4
  400 CONTINUE

      RETURN

   90 FORMAT(1H0,15X,9HFRAME NO.,5X,7HTAR. ID,5X,7HTAR. ID,15X,9HFRAME N
     1O.,5X,7HTAR. ID,5X,7HTAR. ID)
  100 FORMAT(1H ,15X,I5,9X,I5,7X,I5,17X,I5,9X,I5,7X,I5)
      END
```

APPENDIX A

```
08-22-68

 C LINKED
       SUBROUTINE LINKED(J)
       INTEGER QUEUE, PRIOR
       INTEGER FRAME
       DIMENSION PRIOR(63)
       COMMON /QUEUE/QUEUE(200,11)
       COMMON /CHAIN/IADDR(1000),IRAME(40,2),LINK(4,40),II(40)
       COMMON /NPIX/NPIX
       COMMON /ITIME/ITIME
       EQUIVALENCE (FRAME(1),IRAME(1))
       DATA(PRIOR(I),I=1,63)/2HOD,01,21,2HCD,02,22,2HBD,3,23,2HSD,4,24,2H
      10 ,5,25,2HC ,6,26,2HB ,7,27,2HS ,8,28,2HV ,0,9,2HMC,10,30,2HOR,11,
      231,2HCR,12,32,2HBR,13,33,2HSR,14,34,2HOH,15,36,2HCH,16,37,2HBH,17,
      338,2HSH,18,39,2HA ,19,35,2HL ,20,40,2HLX,0,29/

 C     N EQUALS ZERO FOR 1ST PRIORITY ELSE ONE
       N=0

       DO 10 I=1,63,3
       IF(PRIOR(I).EQ.QUEUE(J,2)) GO TO 15
   10  CONTINUE
       WRITE(6,16)
  16   FORMAT(11H1ERROR NO.1)
       STOP

 C     INITIALIZE FOR TWO DATA RATES
  15   IFACE=QUEUE(J,3)
       IJ = I
 C     IS THERE A LOW DATA RATE
       IF (PRIOR(IJ+1).EQ.0) GO TO 27
 C     LOW DATA RATE
       IF(QUEUE(J,7)+QUEUE(J,10).GT.ITIME+1000)GOTO27
       IADDR(ICNT+1)=QUEUE(J,7)+QUEUE(J,10)
       IPRIOR=PRIOR(I+1)

 C     TEST IF FIRST ENTRY IN LINK
  20   IF(LINK(IFACE,IPRIOR).NE.0)GO TO 30
 C     THIS IS FIRST ENTRY IN THIS LINK
       IADDR(ICNT+2)=0
 C     PLACE ADDR OF ENTRY IN LINE ORIGIN
       LINK(IFACE,IPRIOR)=ICNT
 C     PLACE ADDR OF RAL ENTRY IN CHAIN
  25   IADDR(ICNT)=J
 C     UPDATE LOC OF NEXT ENTRY IN IADDR BLOCK
       ICNT=ICNT+3
       IF(N.NE.0) RETURN

 C     TEST IF HI DATA RATE IS ACTIVE
  27   IF(QUEUE(J,7)+QUEUE(J,08).GT.ITIME+1000)RETURN
 C     HIGH DATA RATE
       IADDR(ICNT+1)=QUEUE(J,7)+QUEUE(J,8)
       N=1
```

APPENDIX A 08-22-68

```
      IPRIOR = PRIOR(IJ+2)
      GO TO 20

C     THERE ARE OTHER ENTRIES IN CHAIN SO WE
C     MUST TRACE DOWN CHAIN UNTIL WE FIND ENTRY
C     WHICH HAS TIME GREATER THAN TIME OF ENTRY
C     TO BE PLACED IN CHAIN.
 30   I=LINK(IFACE,IPRIOR)
C     TEST IF TIME OF ENTRY IS GT THIS ENTRY.
C     TEST FOR DUMMY ENTRY (TIME = -1000)
      IF(IADDR(I+1)+1000)34,32,34
C     TEST IF TIME OF TOP ENTRY IS LT NEW ENTRY
 34   IF(IADDR(I+1).LT.IADDR(ICNT+1)) GO TO 32
C     THIS ENTRY GOES 1ST IN CHAIN
      IADDR(ICNT+2) = I
      LINK(IFACE,IPRIOR) = ICNT
      GO TO 25

C     SET UP LOOP TO CONTINUE DOWN CHAIN
C     FIRST TEST FOR DUMMY ENTRY
 31   IF(IADDR(I+1)+1000) 310,32,310
 310  IF(IADDR(I+1).GT.IADDR(ICNT+1)) GO TO 35
C     TRACE DOWN CHAIN AND CONT. SEARCHING
C     TEST IF END OF LINK
 32   IF(IADDR(I+2).EQ.0)GO TO 40
      IPREV=I
      I=IADDR(I+2)
      GO TO31

C     ENTRY MUST BE INSERTED HERE
 35   ISAVE=IADDR(IPREV+2)
      IADDR(IPREV+2)=ICNT
      IADDR(ICNT+2)=ISAVE
      GO TO 25

C     THIS ENTRY MUST BE PLACED AT END OF CHAIN
 40   IADDR(I+2)=ICNT
      IADDR(ICNT+2)=0
      GO TO25
      END
```

APPENDIX A 08-22-68

```
 C FRAMED
        SUBROUTINE FRAMED(JTIM,N)
        INTEGER ADDR,QUEUE
        COMMON /QUEUE/QUEUE(200,11)
        COMMON /CHAIN/IADDR(1000),IRAME(40,2),LINK(4,40),II(40)
        COMMON /NPIX/NPIX
        COMMON /ITIME/ITIME
        DIMENSION ADDR(1000)
        EQUIVALENCE (ADDR(1),IADDR(1))
 C      JTIME IS ENABLE TIME FOR NEXT 4 FRAMES
 C      SEARCH PRIORTY CHAIN FROM HIGH TO LOW
 C      FILL NEXT 4 FRAMES
 C      L COUNTS THE 4 FRAMES TO BE DONE
        L=4
  5     IF(L.EQ.0) RETURN
        JZ=0
        DO 13 J=1,40
 C      J DENOTES PRIORITY CLASS
 C      I DENOTES RADAR FACE
        DO10I=1,4
  7     K=LINK(I,J)
        IF(K.EQ.0) GOTO 10
        IF (ADDR(K+1)+1000) 6,6,9
 C      UNLINK DUMMY ENTRY
  6     LINK(I,J) = ADDR(K+2)
        GO TO 7
  9     IF(ADDR(K+1).GT.JTIM)GO TO10
        IF(JZ.NE.0) GO TO 8
        JZ = K+1
        I4 = I
  8     IF(ADDR(K+1).GE.ADDR(JZ)) GO TO 10
        JZ = K+1
        I4 = I
 10     CONTINUE
 C      WERE THERE ANY VALID ENTRIES
        IF(JZ.EQ.0) GOTO13
 C      SET I TO THE FACE THAT WAS PICKED
        I = I4
        K=JZ-1
        GOTO15
 13     CONTINUE
 C      NO JOB WANTS TO BE DONE BY JTIME
        WRITE(6,100)
100     FORMAT(21H ERROR NO. 2 *FRAMED*)
 C      COUNT OFF THE EMPTY FRAMES
 C      PUT ZERO IN REMAINING EMPTY FRAMES
```

APPENDIX A 11 08-22-68

```
      MM=N+L
      DO14I=N,MM
      IRAME(I,1)=0
   14 IRAME(I,2)=0
      N=MM
      RETURN
C     K DENOTES A TASK IN ADDR TO BE SCHEDULED
   15 K1=ADDR(K)
C     K1 IS ITS LOC IN QUEUE
C     PUT IT IN IRAME
      IRAME(N,1)=K1
      QUEUE(K1,10) = QUEUE(K1,11)
      QUEUE(K1,8) = QUEUE(K1,9)


      QUEUE(K1,7) = ITIME+N*25
C     UPDATE TIME OF TASK
C     REMOVE TASK FROM CHAIN
      LINK(I,J)=ADDR(K+2)
   17 IF(ADDR(K).NE.ADDR(K+3)) GOTO 18
      ADDR(K+4)=-1000
   22 IF((QUEUE(K1,7)+QUEUE(K1,8).GT.ITIME+1000).AND.(QUEUE(K1,7)+QUEUE(
     2K1,10).GT.ITIME+1000))GO TO 23
      CALL LINKED (K1)
C     IS INTERVAL SHORT (0) OR LONG
   23 IF(QUEUE(K1,6).EQ.0)GO TO 19
C     IF LONG, FRAME IS FULL
      IRAME(N,2)=0
      GO TO 40
   18 IF(ADDR(K).NE.ADDR(K-3))GO TO 22
      ADDR(K-2)=-1000
      GOTO22
C     SINCE FIRST PULSE WAS SHORT LOOK FOR ANOTHER
C     STAY ON SAME RADAR FACE
C     BEGIN AGAIN AT SAME PRIORITY CLASS
   19 JJ=J
      DO 30 J=JJ,40
C     GET FIRST LINK.
      K = LINK(I,J)
C     ISW1 DENOTES HAVE TOP JOB IN CHAIN IF ZERO
      ISW1 = 0
C     ARE THERE ANY MORE IN THIS PRIORITY CLASS
C     IF NOT GO TO NEXT PRIORITY CLASS
   26 IF(K.EQ.0) GO TO 30
C     IS JOB A DUMMY
      IF(ADDR(K+1)+1000) 24,27,24
C     JOB IS REAL
C     CHECK ITS TIME TO SEE IF ACTIVE
   24 IF(ADDR(K+1).LE.JTIM) GO TO 35
```

APPENDIX A 08-22-68

```
C      OTHERWISE CONTINUE DOWN CHAIN
C      BACK DATE AND UPDATED
 27    IPREV = K
       ISW1 = ISW1 + 1
       K = ADDR(K+2)
       GO TO 26
 30    CONTINUE

C      THERE ARE NO MORE JOBS FOR REST OF THIS FRAME
       IRAME(N,2) = 0

C      BACKDATE AND UPDATE
 40    L = L-1
       N = N+1
       GO TO 5

C      WE HAVE A POTENTIAL JOB
C      IS IT SHORT ( QUEUE ENTRY = 0)
C      IF NOT GO ON
C      K1 IS ITS LOC IN QUEUE
 35    K1=ADDR(K)
       IF(QUEUE(K1,6).NE.0) GO TO 27
C      JOB IS SHORT, IT SHOULD BE PUT IN FRAME
C      PUT IT IN IRAME
       IRAME(N,2)=K1
       QUEUE(K1,10) = QUEUE(K1,11)
       QUEUE(K1,8) = QUEUE(K1,9)

        QUEUE(K1,7) = ITIME+N*25
C      UPDATE TIME OF TASK
C      REMOVE TASK FROM CHAIN
C      THERE ARE TWO WAYS TO DO THIS DEPENDING ON IF
C      FIRST IN CHAIN (ISW1 = 0)
       IF(ISW1.NE.0) GO TO 46
C      THIS IS THE TOP JOB IN THE CHAIN
       LINK(I,J) = ADDR(K+2)
C      ALSO DELETE HIS BROTHER IN LIST
C      BROTHER MUST BE EITHER BEFORE OR AFTER
 51    IF(ADDR(K).NE.ADDR(K+3)) GO TO 48
       ADDR(K+4) = -1000
 52    IF((QUEUE(K1,7)+QUEUE(K1,8).GT.ITIME+1000).AND.(QUEUE(K1,7)+QUEUE(
      2K1,10).GT.ITIME+1000))GO TO 40
       CALL LINKED(K1)
       GO TO 40

 48    IF(ADDR(K).NE.ADDR(K-3)) GO TO 52
       ADDR(K-2) = -1000
       GO TO 52

C      THIS IS NOT TOP JOB IN CHAIN
C      REMOVE IT FROM CHAIN
 46    ADDR(IPREV+2) = ADDR(K+2)
```

APPENDIX A

```
1  08-22-68
          GO TO 51
          END
```

Signed and sealed this 23rd day of May 1972.

[SEAL]

Attest:

EDWARD M. FLETCHER, JR.,

ROBERT GOTTSCHALK